US009794237B2

(12) United States Patent
Johnson et al.

(10) Patent No.: US 9,794,237 B2
(45) Date of Patent: Oct. 17, 2017

(54) SECURED NETWORKS AND ENDPOINTS APPLYING INTERNET PROTOCOL SECURITY

(71) Applicants: Robert A Johnson, Malvern, PA (US); Sarah K Inforzato, Malvern, PA (US)

(72) Inventors: Robert A Johnson, Malvern, PA (US); Sarah K Inforzato, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 132 days.

(21) Appl. No.: 14/753,120

(22) Filed: Jun. 29, 2015

(65) Prior Publication Data
US 2016/0380984 A1 Dec. 29, 2016

(51) Int. Cl.
*H04L 29/06* (2006.01)
*H04L 12/46* (2006.01)

(52) U.S. Cl.
CPC ...... *H04L 63/0485* (2013.01); *H04L 12/4633* (2013.01); *H04L 63/0272* (2013.01); *H04L 63/061* (2013.01); *H04L 63/0853* (2013.01); *H04L 63/102* (2013.01); *H04L 63/164* (2013.01)

(58) Field of Classification Search
CPC ............... H04L 63/485; H04L 12/4633; H04L 9/0841; H04L 63/205
See application file for complete search history.

(56) References Cited

U.S. PATENT DOCUMENTS

| | | | | |
|---|---|---|---|---|
| 2005/0154889 A1* | 7/2005 | Ashley | ............... | H04L 63/0435 713/171 |
| 2012/0078998 A1* | 3/2012 | Son | ..................... | H04L 63/0272 709/203 |
| 2012/0204253 A1* | 8/2012 | Sugimoto | .......... | H04L 12/4633 726/12 |
| 2012/0224566 A1* | 9/2012 | O'Leary | .............. | H04L 63/164 370/338 |
| 2013/0067345 A1* | 3/2013 | Das | .......................... | G06F 8/63 715/740 |

* cited by examiner

*Primary Examiner* — Ellen Tran
(74) *Attorney, Agent, or Firm* — Robert P. Marley; Richard J. Gregson

(57) ABSTRACT

A method of managing secure communications states in an endpoint within a secure network is disclosed. The method includes, in a disconnected state, transmitting from a first endpoint to a second endpoint a first message including an authorization token. The method further includes, in the pending state, receiving from the second endpoint a second message including a second authorization token at the first endpoint. The method includes, based on the receipt of the second message, entering an open state and initializing a tunnel between the first and second endpoints using an IPsec-based secured connection. The method also includes, upon termination of the tunnel due to a termination or timeout message issued by at least one of the first and second endpoints, entering a closed state.

20 Claims, 24 Drawing Sheets

| | U1 | U2 |
|---|---|---|
| 1 | ↓ Stealth Enable/Logon | ↓ Stealth Enable/Logon |
| 2 | ↑ TUNNEL INIT (U2) IOCTL from callout driver | |
| 3 | Create U1.ENC and U1.VAL<br>For each COI<br>  Encrypt U1.ENC and U1.VAL with COI#<br>  Add to AuthToken<br>Sign AuthToken with U1.VAL<br>Send SESS0 PDU<br>State = PEND_OPEN<br>Start Retry timer | |
| 4 | ————————— SESS0 —————————▶ | |
| 5 | | For each COI<br>  For each Token entry<br>    If decrypt Token entry with COI#<br>    Import U1.ENC and U1.VAL<br>    If validate AuthToken with U1.VAL<br>      Create U2.ENC and U2.VAL<br>      Create U2.ECDH key pair<br>      Build SESS1 PDU<br>      State = PEND_FINAL<br>      Start Retry timer |
| 6 | ◀————————— SESS1 ————————— | |
| 7 | If decrypt with U1.ENC<br>  For every COI in AuthToken<br>    If decrypt with COI#<br>    Import U2.ENC and U2.VAL<br>    If validate AuthToken with U2.VAL<br>      If validate Sess1 with U2.VAL<br>    Import U2.ECDH<br>    Create U1.ECDH key pair<br>    Generate shared secret, open IPSec<br>    Build SESS2 PDU<br>    State = OPEN<br>    Start Keep alive timer | |
| 8 | ————————— SESS2 —————————▶ | |
| 9 | | If decrypt with U2.ENC<br>  If validate Sess.2 with U2.VAL<br>  Import U1.ECDH<br>  Generate shared secret and open IPSec<br>  State = OPEN<br>  Start Keep alive timer |
| 10 | ↓ TUNNEL OPEN (U2) to callout driver | ↓ TUNNEL OPEN (U1) to callout driver |

FIG. 10

| | U1 | U2 |
|---|---|---|
| 1 | ↓ Stealth Enable/Logon | ↓ Stealth Enable/Logon |
| 2 | ↑ TUNNEL INIT (U2) IOCTL from callout | |
| 3 | Create U1.ENC and U1.VAL<br>For each COI<br>    Encrypt U1.ENC and U1.VAL with COI#<br>    Add to AuthToken<br>Sign AuthToken with U1.VAL<br>Send SESSo PDU<br>State = PEND_OPEN<br>Start Retry timer | |
| 4 | ———————— SESS0 ————————▶ | |
| 5 | | If COI decryption or validation fails<br>    Drop incoming PDU |
| 6 | Time out<br>    Rebuild SESSo PDU | |
| 7 | ———————— SESS0 ————————▶ | |
| 8 | Time out<br>    If Retry Limit Reached | |
| 9 | | If COI decryption or validation fails<br>    Drop incoming PDU |
| 10 | ↓ TUNNEL CLOSED (U2) to callout driver | |

| | U1 | U2 |
|---|---|---|
| 1 | ↓ Stealth Enable/Logon | ↓ Stealth Enable/Logon |
| 2 | ↑ TUNNEL INIT (U2) IOCTL from callout driver | |
| 3 | Create U1.ENC and U1.VAL<br>For each COI<br>  Encrypt U1.ENC and U1.VAL with COI#<br>  Add to AuthToken<br>Sign AuthToken with U1.VAL<br>Send SESS0 PDU<br>State = PEND_OPEN<br>Start Retry timer | |
| 4 | SESS0 ⟶ | |
| 5 | | If validation Succeeds<br>  Build and send SESS1 PDU |
| 6 | ⟵ SESS1 | |
| 7 | If validation Succeeds<br>  Build and send SESS2 PDU | |
| 8 | SESS2 ⟶ | |
| 9 | ↓ TUNNEL OPEN (U1) IOCTL to callout driver | If validate Fails<br>  Drop incoming PDU |
| 10 | | Time out<br>  If Retry Limit not reached<br>    Build and send SESS1 PDU |
| 11 | ⟵ SESS1 | |
| 12 | | Else<br>  If Remote session keys<br>    Build and send TERM PDU |
| 13 | ⟵ TERM | |
| 14 | If validation Succeeds<br>  Process TERM PDU<br>↓ TUNNEL CLOSE (U2) to callout driver | ↓ TUNNEL CLOSE (U1) IOCTL to callout driver |

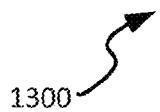

| | U1 | Appl1 |
|---|---|---|
| 1 | ↓ Stealth Enable/Logon<br><br>ENABLE_STEALTH IOCTL to MLSTPGW Driver | |
| 2 | Init License tunnel —— INI2 PDU (Request) ——→ | |
| 3 | License tunnel Open ←—— Ini2 PDU (Response) —— | |
| 4 | ↑ LICENSE OPEN IOCTL from MLSTPGW driver<br><br>IpSec tunnels can now open<br>.<br>.<br>. | |
| 5 | Successful IpSec Session Exchange with U2 | |
| 6 | ↓ TUNNEL OPEN (U2) IOCTL to callout driver | |
| 7 | Start logging process<br>↓ MT_LOG_EVENT to MLSTPGW driver | |
| 8 | MLSTPGW driver builds and sends<br>Tunnel Open LOG PDU ——— LOG PDU ———→ | |
| 9 | | ↑ STEALTHII LOG to MLSTP Service |
| 10 | | MLSTP_Service writes "IPSec Tunnel Open" Event to System Log |

SECURED NETWORKS AND ENDPOINTS APPLYING INTERNET PROTOCOL SECURITY

CROSS-REFERENCE TO RELATED APPLICATIONS

The present application claims priority from U.S. Provisional Patent Application No. 62/018,937 filed on Jun. 30, 2014, the disclosure of which is hereby incorporated by reference in its entirety.

The present application is also related to from the following related and commonly assigned U.S. Patent Applications:

1. U.S. Provisional patent application entitled: Distributed Security on Multiple Independent Networks using Secure "Parsing" Technology, by Robert Johnson, Ser. No. 60/648,531, filed 31 Jan. 2005;

2. U.S. patent application entitled: Integrated Multi-Level Security System, by Robert Johnson, U.S. Ser. No. 11/339,974 filed 26 Jan. 2006 claiming the benefit of the above provisional applications;

3. U.S. patent application entitled: Integrated Multi-Level Security System, by Robert Johnson et al., Ser. No. 11/714,590 filed 6 Mar. 2007 which is a continuation-in-part of U.S. application Ser. No. 11/339,974;

4. U.S. patent application entitled: Integrated Multi-Level Security System, by Robert Johnson et al., Ser. No. 11/714,666 filed 6 Mar. 2007 which is a continuation-in-part of U.S. application Ser. No. 11/339,974; and 5. U.S. patent application entitled: Integrated Multi-Level Security System, by Robert Johnson et al., Ser. No. 11/714,598 filed 6 Mar. 2007 which is a continuation-in-part of U.S. application Ser. No. 11/339,974.

6. U.S. patent application Ser. No. 12/272,012, entitled "Block Level Data Storage Security System", filed 17 Nov. 2008. The present disclosure also claims the benefit of commonly assigned U.S. patent application Ser. No. 12/336,558, entitled "Data Recovery Using Error Strip Identifiers", filed 17 Dec. 2008.

7 U.S. patent application Ser. No. 12/336,559 entitled "Storage Security Using Cryptographic Splitting", filed 17 Dec. 2008; U.S. patent application Ser. No. 12/336,562, entitled "Storage Security Using Cryptographic Splitting", filed 17 Dec. 2008; U.S. patent application Ser. No. 12/336,564, entitled "Storage Security Using Cryptographic Splitting", filed 17 Dec. 2008; and U.S. patent application Ser. No. 12/336,568, entitled "Storage Security Using Cryptographic Splitting", filed 17 Dec. 2008.

8. U.S. patent application Ser. No. 12/342,636 entitled "Storage Communities Of Interest Using Cryptographic Splitting", filed 23 Dec. 2008. U.S. patent application Ser. No. 12/342,575, entitled "Storage Communities Of Interest Using Cryptographic Splitting", filed 23 Dec. 2008, U.S. patent application Ser. No. 12/342,610, entitled "Storage Communities Of Interest Using Cryptographic Splitting", filed 23 Dec. 2008.

9. U.S. patent application Ser. No. 12/342,379, entitled "Secure Network Attached Storage Device Using Cryptographic Splitting", filed 23 Dec. 2008.

10. U.S. patent application Ser. No. 13/493,023, entitled "Software Handling Of Hardware Error Handling In Hypervisor-Based Systems", filed 5 Sep. 2012.

11. U.S. patent application Ser. No. 13/547,148, entitled "Automated Provisioning of Virtual Machines", filed 12 Jul. 2012.

12. U.S. patent application Ser. No. 14/042,239, entitled "Negotiation of Security Protocols and Protocol Attributes in Secure Communications Environment", filed 30 Sep. 2013.

13. U.S. patent application Ser. No. 14/042,182, entitled "Secured Communications Arrangement Applying Internet Protocol Security", filed 30 Sep. 2013.

The disclosures of each of these applications are hereby incorporated by reference in its entirety as if set forth in this application.

TECHNICAL FIELD

The present application relates generally to secured communications and storage systems, and in particular secured networks and endpoints applying internet protocol security.

BACKGROUND

Modern organizations generate store, and communicate large quantities of data. In many instances, organizations include individuals having different rights to data, or different rights to communicate with other individuals or access particular computing resources. It is frequently important that such organizations be able to quickly and securely access the data stored at the data storage system. In addition, it is frequently important that data stored at a data storage system, or communicated between computing systems, be recoverable if the data is communicated or written incorrectly or are otherwise intercepted or corrupted.

To address the above issues, Unisys Corporation of Blue Bell, Pa. developed a Stealth solution that uses a kernel-level driver to implement end-to-end cryptographic connections for communication of data across public and private networks. This solution allows users to communicate with other users having common user rights, while segregating user groups by way of assignment of different cryptographic keys used for each user group, or "community of interest". However, the Stealth solution has some drawbacks. First, the existing Stealth solution is only compatible with IPv4 networks; with the increasing proliferation of IPv6 addressing, some migration is needed. Secondly, the existing Stealth solution resides primarily in drivers at the kernel level, and as such is specifically tailored for use on specific operating systems (e.g., Windows-based systems); an incompatible computing system is typically placed behind a Stealth-enabled appliance that can be used to route communications on the behalf of that incompatible computing system. Furthermore, since the existing Stealth solution utilizes a proprietary cryptographic library, it is less trusted by large corporations and governments, who prefer standards-based security systems.

Internet Protocol Security (IPsec) is one such standards-based protocol suite used for securing Internet Protocol (LP) communications by authenticating and encrypting each IP packet of a communication session. IPsec includes protocols for establishing authentication between agents at the beginning of the session and negotiation of cryptographic keys to be used during the session. IPsec is an end-to-end security scheme of the Internet Protocol Suite. As compared to other security systems, such as SSL, SSH, or TLS, IPsec operates in the Internet Layer rather than operating in the upper layers of the TCP/IP model. Hence, IPsec protects any application traffic across an Internet Protocol (IP) network. Applications do not need to be specifically designed to use IPsec, whereas TLS/SSL is required to be designed into an application to protect the application protocols. In addition, IPsec operates in both IPv4 and IPv6-enabled networks.

However, IPsec is not without drawbacks. Existing IPsec-enabled systems typically negotiate to create IPsec tunnels, or secure tunnels, on a point-to-point basis, rather than allowing for data access by multiple entities within the same "community of interest". Furthermore, IPsec is only available on modern computing systems. In Windows environments, IPsec is only available as part the native operating system since the release of Windows 7; prior versions lack support for this security protocol suite. Furthermore, different implementations of IPsec on different types of computing systems are handled differently, leading to inconsistencies in connection parameters. Additionally, IPsec is built based on a premise that two computing systems can negotiate security parameters; when two such systems intend to form a secure tunnel, that tunnel is established through use of an IKE key exchange, which requires a response to an initial transmission. However, to accomplish perfect forward secrecy, such trading of security parameters may not be possible. Accordingly, improvements in the various existing secured communications systems are desired.

SUMMARY

In a first aspect, a method of managing secure communications states in an endpoint within a secure network is disclosed. The method includes, in a disconnected state, transmitting from a first endpoint to a second endpoint a first message including an authorization token, the authorization token including one or more entries, each entry corresponding to a community of interest associated with a user of the first endpoint and including an encryption key and a validation key associated with the first endpoint and encrypted with the corresponding community of interest key and entering a pending state. The method further includes, in the pending state, receiving from the second endpoint a second message including a second authorization token at the first endpoint, the second authorization token including one or more entries, each entry corresponding to a community of interest associated with the second endpoint and including an encryption key and a validation key associated with the second endpoint and encrypted with the corresponding community of interest key. The method includes, based on the receipt of the second message, entering an open state and initializing a tunnel between the first and second endpoints using an IPsec-based secured connection. The method also includes, upon termination of the tunnel due to a termination or timeout message issued by at least one of the first and second endpoints, entering a closed state.

In a second aspect, an endpoint computing system includes a processor and a memory communicatively connected to the processor and storing secured communications software. The secured communications software, when executed by the processor, causes the endpoint computing system to perform a method of managing secure communications states within a secure network. The method includes, in a disconnected state, transmitting from the endpoint computing system to a second endpoint a first message including an authorization token, the authorization token including one or more entries, each entry corresponding to a community of interest associated with a user of the endpoint computing system and including an encryption key and a validation key associated with the endpoint computing system and encrypted with the corresponding community of interest key and entering a pending state. The method also includes, in the pending state, receiving from the second endpoint a second message including a second authorization token at the endpoint computing system, the second authorization token including one or more entries, each entry corresponding to a community of interest associated with the second endpoint and including an encryption key and a validation key associated with the second endpoint and encrypted with the corresponding community of interest key. The method further includes, based on the receipt of the second message, entering an open state and initializing a tunnel between the endpoint computing system and the second endpoint using an IPsec-based secured connection. The method also includes, upon termination of the tunnel due to a termination or timeout message issued by at least one of the endpoint computing system and the second endpoint, entering a closed state.

In a third aspect, a system includes a first endpoint. The first endpoint includes a processor and a memory communicatively connected to the processor and storing secured communications software, the secured communications software, when executed by the processor, causing the first endpoint to perform a method of managing secure communications states within a secure network. The method includes in a disconnected state, transmitting from the first endpoint to a second endpoint a first message including a token, the token including one or more entries, each entry corresponding to a community of interest associated with a user of the first endpoint and including an encryption key and a validation key associated with the first endpoint and encrypted with the corresponding community of interest key and entering a pending state. The method includes, in the pending state, receiving from the second endpoint a second message including a second authorization token at the first endpoint, the second authorization token including one or more entries, each entry corresponding to a community of interest associated with the second endpoint and including an encryption key and a validation key associated with the second endpoint and encrypted with the corresponding community of interest key, the second message further including a signature, an encryption value, and one or more response codes identifying a status of the second endpoint to the first endpoint. The method also includes, based on the receipt of the second message, entering an open state and initializing a tunnel between the endpoint computing system and the second endpoint using an IPsec-based secured connection. The method further includes, upon termination of the tunnel due to a termination or timeout message issued by at least one of the first endpoint and the second endpoint, entering a closed state. The one or more response codes identify the second endpoint to the first endpoint as a proxy for a third endpoint.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 10 is a message flow diagram illustrating a successful session initialization process, according to an example embodiment of the present disclosure;

FIG. 11 is a message flow diagram illustrating a failed session initialization process based on a lack of correct encryption/decryption keys, according to an example embodiment of the present disclosure;

FIG. 13 is a message flow diagram illustrating a failed session initialization process after a tunnel between systems has been established, according to an example embodiment

FIG. 17 is a message flow diagram illustrating a license and logging events in association with an open connection, according to an example embodiment;

DETAILED DESCRIPTION

Figure 1:
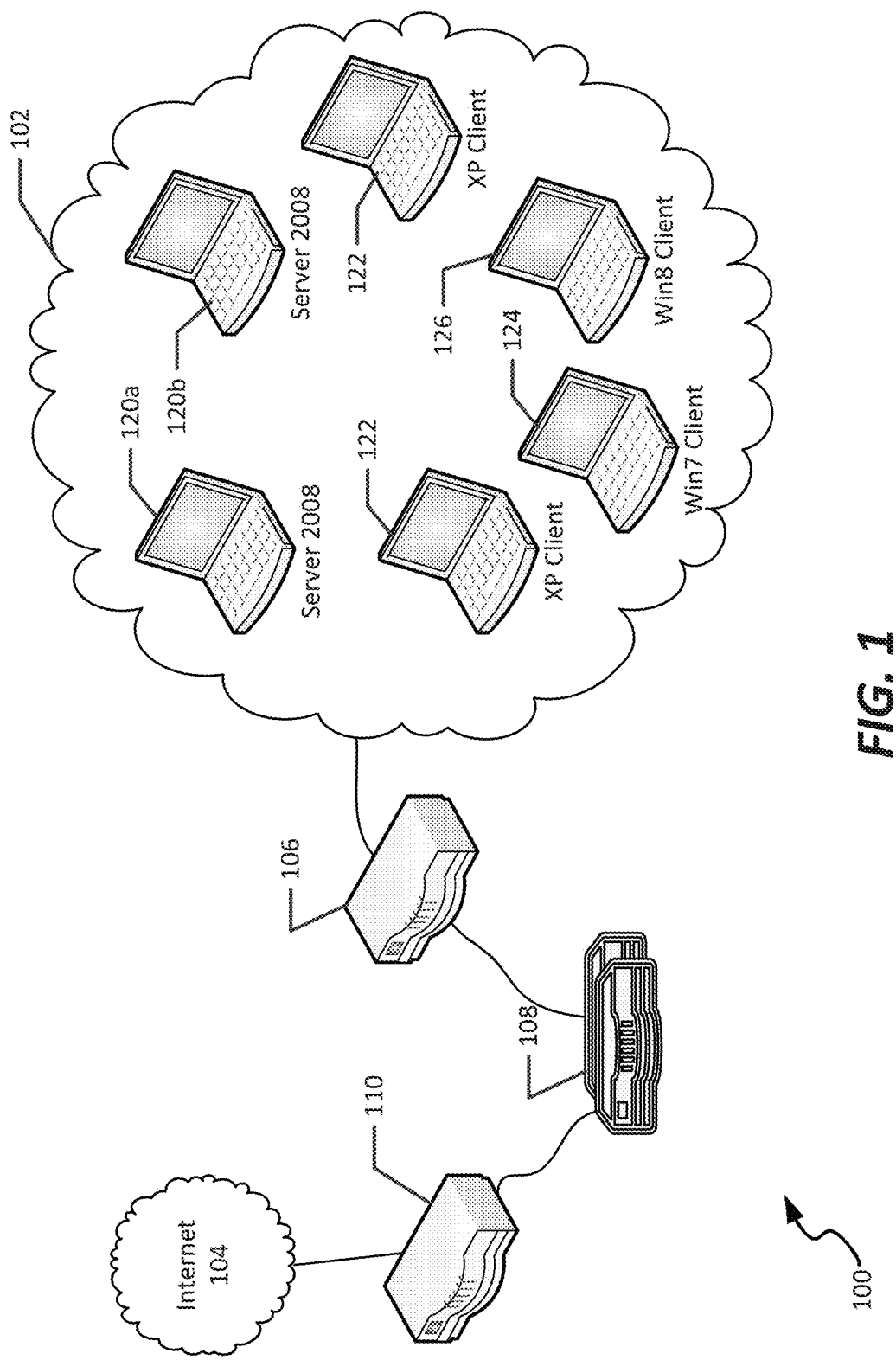
FIG. 1 illustrates an example network in which secured communications and secured endpoints can be implemented, according to the methods and systems described herein.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to improvements to systems and methods for securing endpoints and communication channels, such as the Stealth secure communications and storage system of Unisys Corporation of Blue Bell, Pa. As is included in the existing Stealth system, data to be transmitted among endpoints (e.g., client or server computing systems) is encrypted such that (1) no computing system other than the sender and intended recipient can view the contents of the encrypted message(s), and (2) the messages are not responded to in any way if assessed or received by an unauthorized endpoint (e.g., an endpoint that is not within a common group of resources or entities, e.g., a community of interest).

The present disclosure specifically describes aspects of a secure communications and secure computing systems that provides (1) simplified, application level security controls, (2) support for various addressing schemes, such as Internet Protocol Version 4 (IPv4) and Internet Protocol Version 6 (IPv6), and (3) selectability among a plurality of security constructs, including existing proprietary constructs and standardized constructions that allow for such application level security controls. Additionally, improvements to the mechanisms used to manage connectivity between computing systems that implement the Stealth system provide for both secure communications between two endpoints even within a common community of interest with other endpoints, and ensures that the connectivity is accomplished using perfect forward secrecy, ensuring that any unauthorized access of an endpoint within a Stealth-enabled network is not responded to, even with a response indicating failure. As such, from the perspective of a requesting computing system an unauthorized endpoint appears "dark" or non-responsive. Additional features, such as a callout driver configured to manage creation and negotiation of an IPsec-based tunnel using specific defined processes, are provided as well.

In example embodiments, and as discussed further below, the IPsec-based Stealth solution can be employed in either an entirely IPsec-based secure network, or within a mixed network in which IPsec coexists with a Stealth network employing a traditional bit-based splitting and encrypting/decrypting arrangement, which utilizes an existing multi-level secure transport protocol (MLSTP) secure communications construct. In both configurations, all endpoints in the Stealth network are required to be licensed with a Stealth license that supports earlier versions of the Stealth security protocol. In addition, a Stealth appliance may be used, and all licensing and logging is provided through the Stealth appliance (or team of appliances).

A mixed Stealth configuration may be required when the IPsec-based system is deployed in an existing Stealth network in which endpoints are already running a previous Stealth configuration, or when the existing (or new) Stealth network must support otherwise unsupported endpoints (e.g., Windows XP, Windows 2003). In still other examples, an entirely IPsec-based secured network can be used; in such cases, no Stealth appliance may be required, but rather the functions of such an appliance can be implemented using a licensing service at a server, as well as key generation and negotiation by each of the various endpoints.

It is noted that a complete description of the existing Stealth solution may be found in several pending and commonly assigned U.S. patent applications, listed above. All of these applications are hereby incorporated by reference as if they were set out here in their entirety.

I. Overall Infrastructure of IPsec-Based Stealth Solution

FIG. 1 illustrates an example network 100 in which the various improved secured communications and secured endpoints can be implemented, according to the methods and systems described herein. The example network 100 discloses an arrangement in which a particular entity 102 is communicatively connected to the internet 104 via a variety of networking equipment, such as a router 106, gateway device(s) 108, and additional routers 110 at a far end prior to reaching a remote resource or server as desired. As noted in the example network 100, the entity 102 may include a variety of different types of computing systems. For example, in the embodiment shown, the network 100 includes servers 120a-b running Microsoft Windows Server 2008, as well as client computing devices running a variety different operating systems, such as client systems 120 utilizing the Windows XP operating system from Microsoft Corporation of Redmond, Wash., a further client system 124 running the Windows 7 operating system, and a still further client system 126 running the Windows 8 operating system. In alternative embodiments, other operating systems or applications hosted thereon and supporting IPsec-based communication are utilized.

In the embodiments shown, it is respectfully noted that existing Stealth-based systems are incapable of IPv6 support. Accordingly, Windows 7+ endpoints can communicate through IPsec tunnels, if either using an IPv4 or IPv6 addressing scheme. However, Windows XP and Windows Server 2003 systems utilize existing MLSTP-based Stealth, via IPv4; IPv6 capabilities for such systems are not used, since IPsec implementation is not available for such systems and MLSTP-based systems generally do not support IPv6.

In some embodiments of the present disclosure in which the endpoints implementing the IPsec-based features are Windows-based, the methods and systems discussed herein use the Windows Filtering Platform (WFP), an architecture provided in Windows Vista operating systems and above. The WFP allows for filtering, monitoring and/or modification of TCP/IP packets as well as filtering of IPSec traffic. The WFP allows for access to TCP/IP processing at different layers and can be used to filter on incoming or outgoing traffic. The WFP platform can therefore be used by servers 120a-b and client systems 124, 126, but cannot be used by clients 122. As noted in further detail below, the present application accommodates secure communications between both types of systems by negotiating the type of cryptographic security library to be used for a connection between particular endpoints (e.g., clients, servers, or other addressable computing systems generally).

Figure 2:
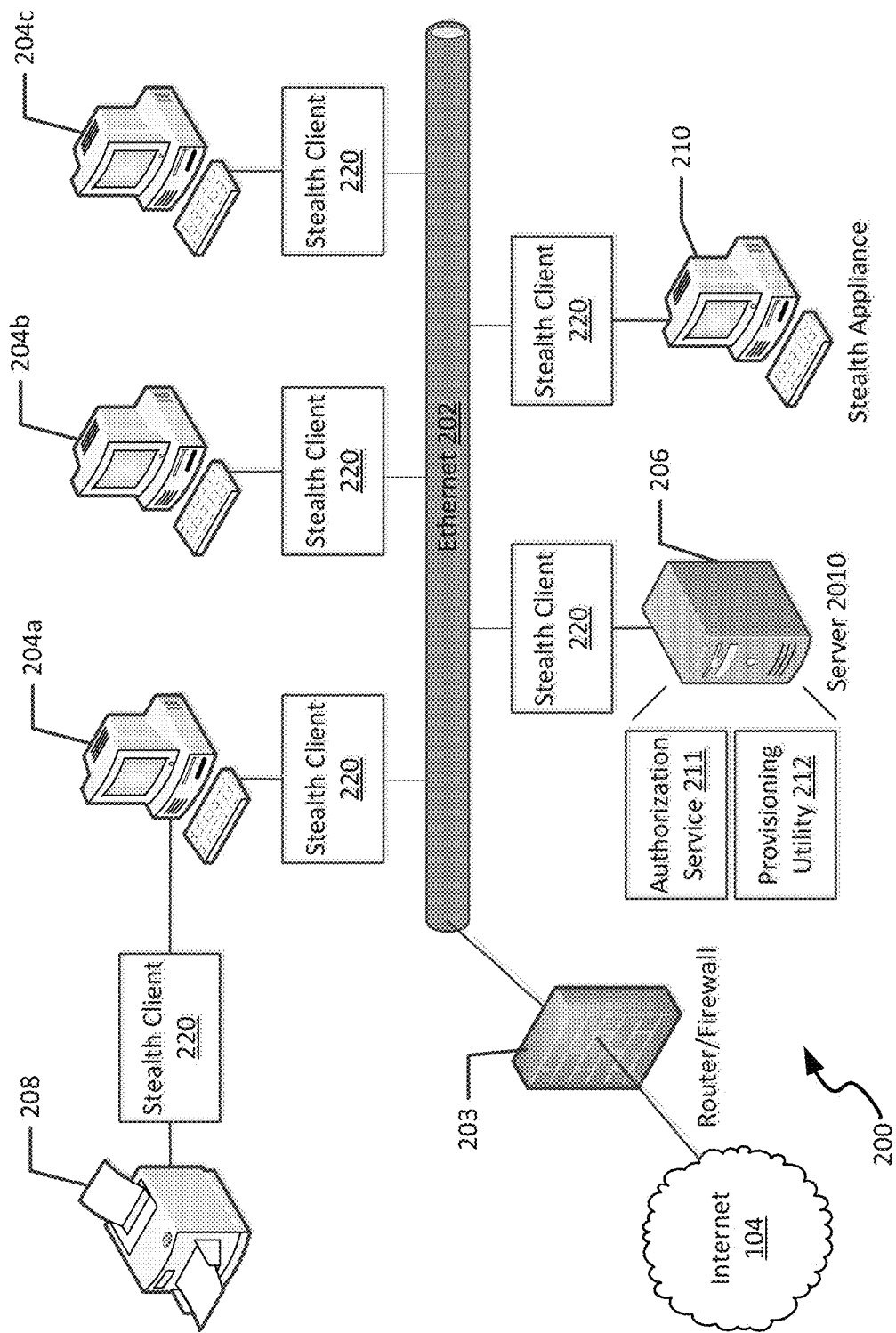
FIG. 2 illustrates an example intranet portion of the network of FIG. 1, illustrating additional details regarding secured interconnection of computing systems, according to an example embodiment.

Referring now to FIG. 2, an example intranet portion 200 of the network 100 of FIG. 1 is shown, illustrating specific details of the secured interconnection of computing systems of FIG. 1. In general, the intranet portion 200 includes a network, such as Ethernet 202, that is communicatively connected to an outside environment, such as the Internet 104, via a firewall 203. Ethernet 202 supports communicative interconnections among a plurality of different types of computers and equipment. For example, in the embodiment shown, client systems 204a-c, a server 206, printer 208 (which could be connected via a client system, such as client system 204a, or directly to the Ethernet 202) could be communicatively interconnected via the Ethernet 202.

Figure 15:
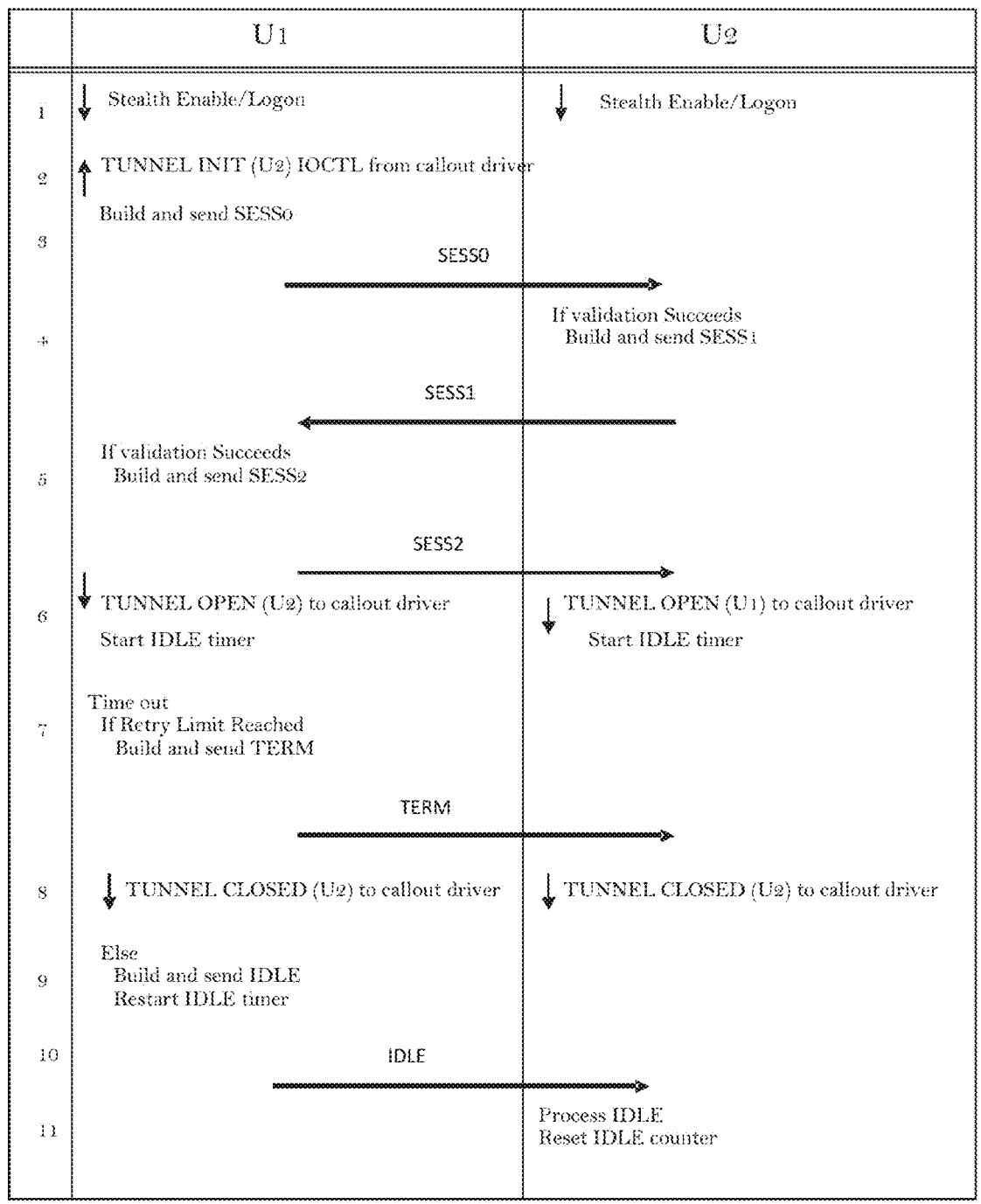
FIG. 15 is a message flow diagram illustrating a session keep-alive event, according to an example embodiment.

To manage secure communications among the various computing systems disclosed, a Stealth appliance, shown as appliance 210, is included within the intranet portion 200. The appliance 210, as further discussed below, manages licensing and negotiation of communities of interest, and receives connections via the existing, kernel-based stealth implementation. The appliance 210, in some embodiments, operates using an existing multi-level secure transport protocol (MLSTP) secure communications construct, and receives license tunnel requests from endpoints that request licenses for creating other tunnels to other endpoints. The appliance 210 also manages logging of events occurring within the secure connections, with log events received via the license tunnel from various endpoints (e.g., client systems 204a-c). An example of a licensing tunnel creation and a license request is shown in FIG. 15, below. In alternative embodiments, the appliance 210 can be implemented as a service within a server, such as a licensing server; in such embodiments, the appliance 210 can be implemented using either MLSTP or an IPsec-based licensing tunnel, which is established and maintained with other endpoints to validate those endpoints' interconnectivity.

Each of the computing systems within the intranet portion 200 are enabled with a stealth client 220. This can include integration of such a stealth client onto the computing system itself, in particular for Windows-based computing systems or computing systems implementing IPsec (e.g., Linux, Apple, Solaris, etc.). It could alternatively include positioning a Stealth appliance, such as appliance 210, between that computing system and the Ethernet 202 that interconnects computing systems 202a-c, 204, thereby isolating that computing system from unsecured communication.

As noted above, the client systems 204a-c or server 206 may be of different types or architectures, or may also simply be using different versions of an operating system. Accordingly, IPsec may or may not be supported on each such computing system, or may be supported in a different way. Accordingly, each computing system will be enabled with a different stealth client based on the type of computing system, either installed on that system or in the form of a standalone stealth appliance. Furthermore, to allow different computing systems to securely communicate, different components may be required to be installed. For example, and as noted above, for Windows XP and Windows Server 2003 endpoints, an existing Stealth solution is installed, using a multi-level secure transport protocol (MLSTP) driver; Windows 7, Server 2008 R2, and Windows 8 systems can include this existing MLSTP driver for backwards-compatibility purposes, but also include, integrated therein, the IPsec communications stack discussed herein, in particular with respect to FIGS. 4 and 6. Accordingly, in some cases, a first and second of the client systems 204*a-b* may connect via an IPsec tunnel, while each of the first and second client systems 204*a-b* may not be able to connect to the third client system 204*c* via IPsec; rather, an existing MLSTP driver may be required, for example due to third client system 204*c* executing an older operating system version, or being a different type of computing system, or otherwise lacking native IPsec support that is compatible with computing systems 204*a-b*. In still further example embodiments, endpoints lacking an IPsec native implementation can have one or more IPsec-enabled user-level or service applications installed thereon to assist with IPsec-based security at that endpoint, thereby allowing for a fully-IPsec-based implementation.

In connection with the present disclosure, and as further illustrated in connection with the driver implementations below, an auto-negotiation process is performed between two endpoints to determine how best to securely interconnect those endpoints. For example, where both endpoints support the IPsec-based stealth implementation discussed herein, IPsec tunnels will be a preferred method to establish connections between systems. Therefore, for IPv6 endpoints, a transmitting endpoint will attempt to connect to that remote endpoint using an IPsec tunnel. For IPv4 endpoints, the transmitting endpoint (assuming it is IPsec-enabled) will attempt to connect via an IPsec tunnel first, but if that attempt fails, the preexisting, MLSTP-based stealth connection is initiated. If that tunnel creation attempt also fails, IPsec could be retried again, with each retried in an alternating sequence until a connection to the far-end endpoint is established.

In some instances, an endpoint enabled in VPN mode can use the MSLTP stealth connection, over which the VPN tunnel is established. In alternative embodiments, the VPN client can call a new driver, or its application-level interface, to establish a secure IPsec-based stealth tunnel.

Figure 16:
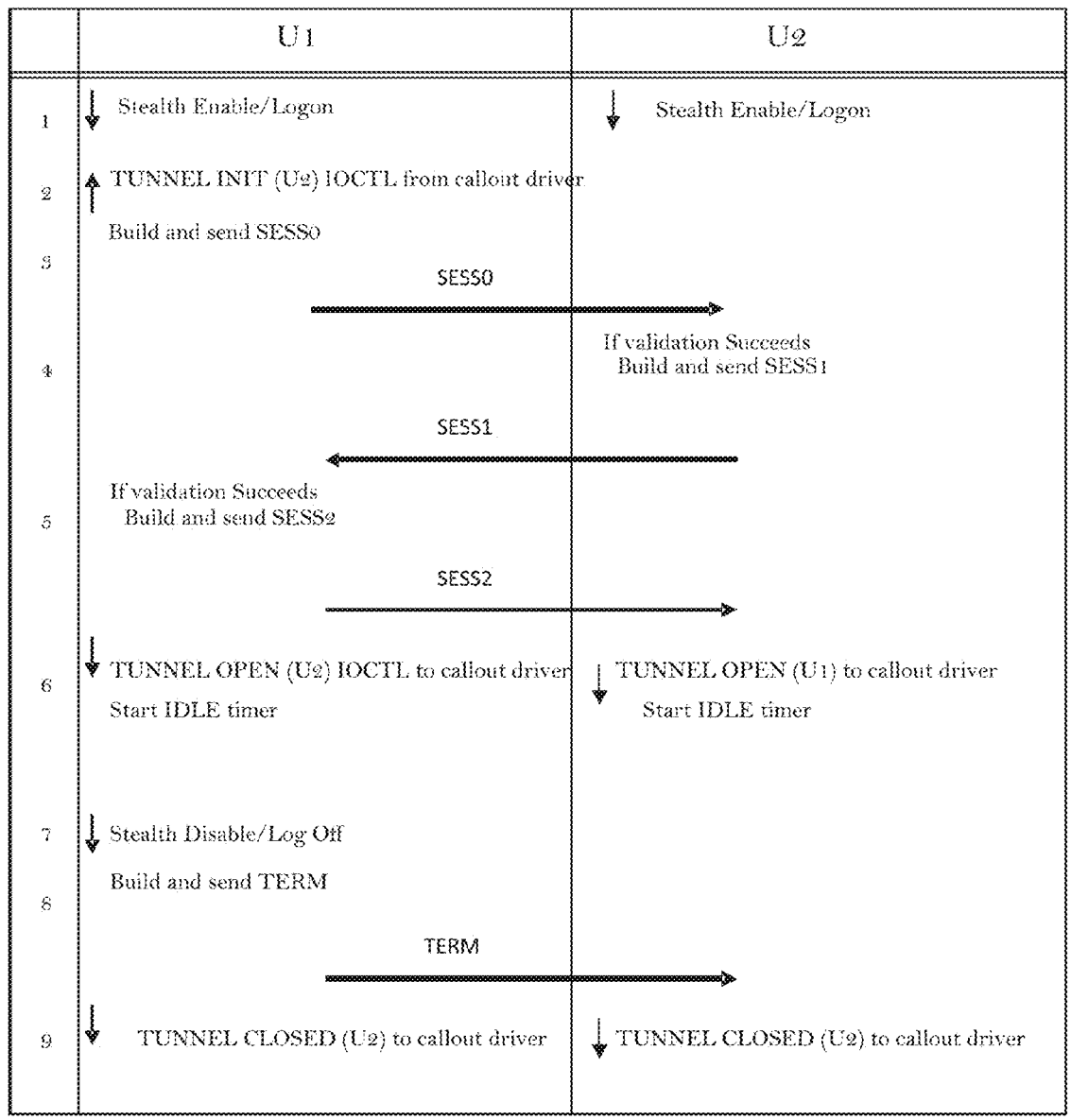
FIG. 16 is a message flow diagram illustrating a session termination, according to an example embodiment.

In the embodiment shown, a server, such as server 206, has installed thereon one or more applications assisting with operation of a stealth-enabled network, including an authorization service 211, and a provisioning utility 212. The authorization service 211 can be installed on either a MLSTP-compatible or IPsec-compatible server system (e.g., a Windows-based system using either Windows Server 2008 or previous versions), and executes in the background on that server. The authorization service allows a user to identify each endpoint and define a set of parameters to be used when communicating among endpoints. The authorization service 211 also stores certificates and keys useable by an endpoint to communicate with other endpoints; an example of a key exchange process with an authorization server, for example to substitute a new key, is illustrated in FIG. 16, described below. The authorization service 211 also handles authorization requests received from endpoints, as further noted below. In example embodiments, a configuration utility included at each authorization service 211 allows a user to form a matching authorization service certificate to be distributed to remote endpoints.

In some embodiments, the authorization service 211 authorizes endpoints associated with a particular service enclave with which that authorization service 211 is associated. Generally, one or more authorization services can be provided, and each associated with a different service enclave (e.g., a grouping of computing resources, for example based on either logical or physical boundaries). Registry settings at one or more endpoints can be configured to define connection parameters for each of the plurality of authorization services, to allow endpoints to attempt authorization at one or more different authorization services in different enclaves.

The provisioning utility 212 allows IP address and port ranges to be specified by a user, and also handles IPv6 addresses for community of interest filters. In example embodiments, the provisioning utility 212 handles IPv6 addresses for COI filters, as well as IP address ranges and port ranges defined in XML-based filters. In some embodiments, the XML-based filters hosted by the provisioning utility are provided to the authorization service 211, which prevents expansion of IP address and/or port ranges beyond those allowed, for assignment to endpoints.

In example embodiments, the appliance 210 receives connections and maintains licensing tunnels with Stealth-enabled endpoints that use both MLSTP and IPsec-based security. However, in example embodiments, the appliance 210 maintains such tunnels using an IPv4-based MLSTP tunnel to each endpoint. Preferably, when an IPv6, IPsec-based endpoint is added to a network, the licensing tunnel to appliance 210 is first created, using such an MLSTP-based tunnel. Furthermore, the appliance 210 can manage logging of license acquisition attempts, endpoints joining/leaving a network, maintenance of tunnel connections, and other issues. While license tunnels are inactive, a protocol service resident on the endpoint (discussed below in connection with FIGS. 4-6) can be used for logging of events at each endpoint.

Figure 3:
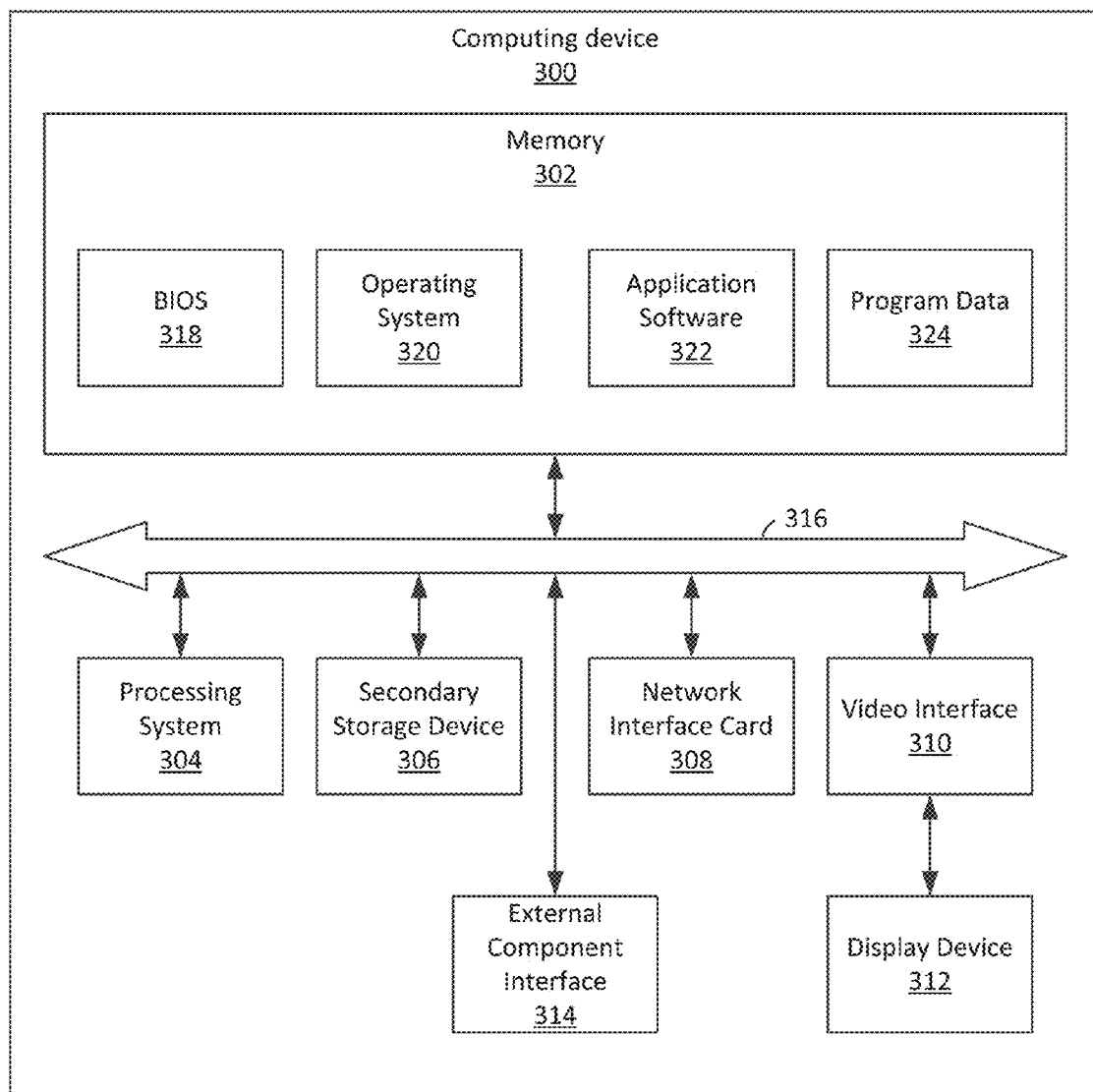
FIG. 3 is a schematic illustration of an example computing system in which aspects of the present disclosure can be implemented.

Referring now to FIG. 3, a schematic illustration of an example computing system in which aspects of the present disclosure can be implemented. The computing device 300 can represent, for example, a native computing system within which one or more of servers 120*a-b*, 122, 124, 126, 204*a-c*, 206, 210. In particular, the computing device 300 represents the physical construct of an example computing system at which an endpoint or server could be established. In particular, in various embodiments, the computing device 300 implements one particular instruction set architecture, and can be used to execute non-native software and/or translate non-native code streams in an adaptive manner, for execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, although in the embodiments of FIG. 3 shown the computing device 300 represents a physical computing system, the various endpoints and servers of the present disclosure need not be directly implemented on a hardware-compatible system. Rather, such endpoints or servers could be implemented within a virtual computing system or virtual partition of a computing system. In some embodiments, the endpoints and/or servers of the present disclosure are implemented in a partitioned, multiprocessor environment, with the various partitions in which endpoints and/or servers reside being managed by a system virtualization software package. One such system virtualization package is the Unisys Secure Partitioning (SPar) partitioning and virtualization system provided by Unisys Corporation of Blue Bell, Pa. Details regarding a virtualized system are provided below in connection with FIGS. 22-24.

In general the endpoints of the present disclosure can be configured various ways, with registry settings selected to configure the endpoint to communicate according to an appropriate communication protocol. In some example embodiments, each IPv6-based system includes a capability to communicate with the authorization server via either IPv4 or IPv6 communications. Other administrator-selected IP-based protocols could be used as well.

Figure 4:
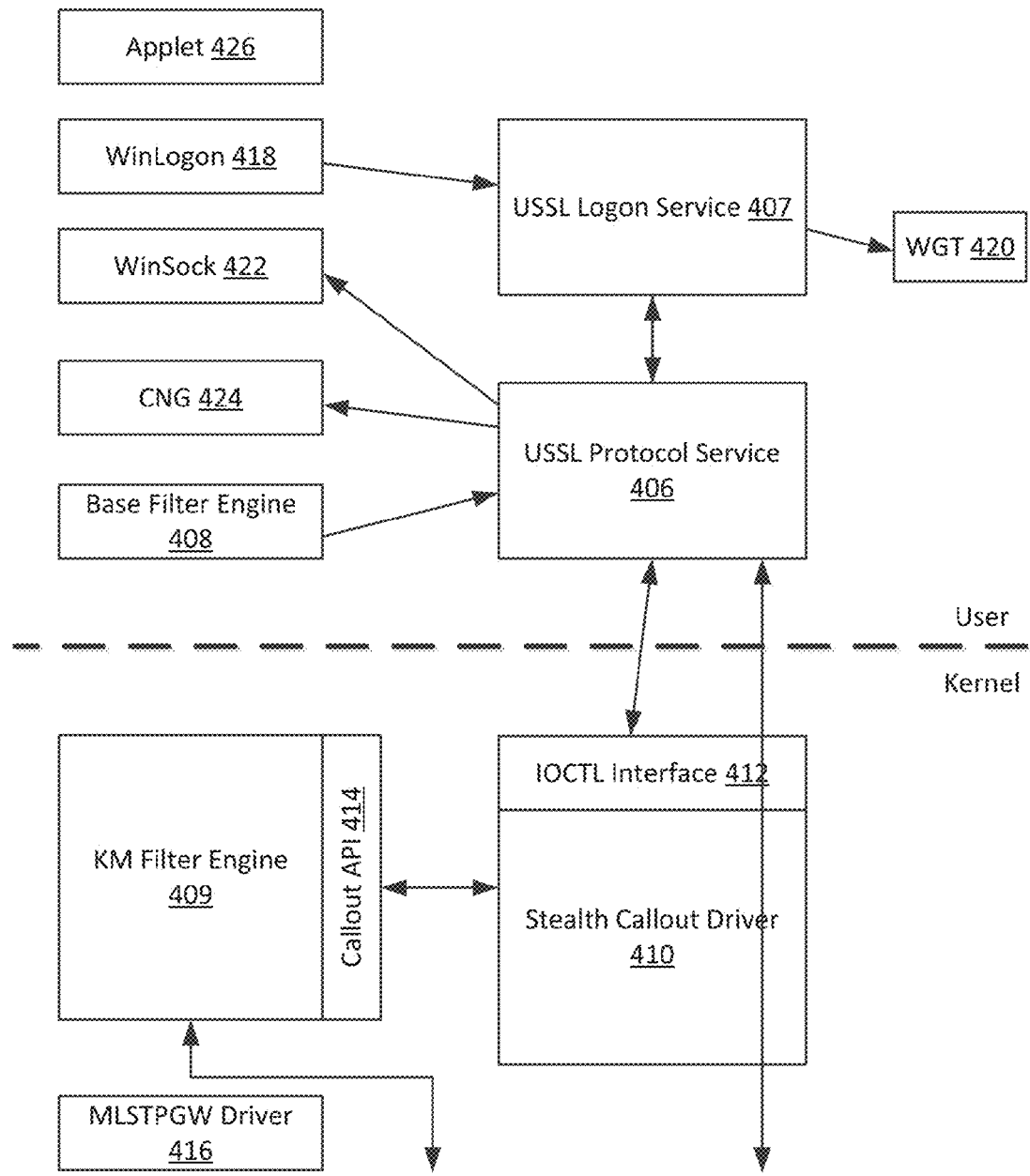
FIG. 4 is an example block diagram of relevant portions of an endpoint implementing the secured communications architecture utilizing internet protocol security (IPsec), as discussed herein.

FIG. 4 is an example block diagram of a system 400 that utilizes an IPsec implementation present on a computing system, in an example embodiment of the present disclosure. The computing system can be, for example, an endpoint, such as one of the computing systems described in FIGS. 1-2. In the embodiment shown, a user level 402 and kernel level 404 are shown, with a user level protocol service 406 that creates one or more WFP filters, and directs use of IPSec for specific endpoint to endpoint traffic. In the embodiment shown, the base filter engine 408 can direct a kernel level filter engine 409.

A callout driver 410, interconnected to the user level protocol service 406 by an IOCTL interface 412, is used to identify new endpoints that require the establishment of a Stealth tunnel. The callout driver 410 interfaces to a callout application programming interface (API) 414, which defines the kernel mode interface to the kernel level filter engine 409. During service start up (Always On) or when Stealth/VPN is enabled (On Demand) (as discussed further in connection with FIGS. 8-9, below), the Stealth service adds a provider and sublayer to the WFP system, and adds the Stealth callouts with initial filters to the system (for both IPv4 and IPv6). The user level logon service 407 then informs the Stealth Driver to enable Stealth using an IOCTL. The driver enables Stealth processing by registering the callouts with the filter engine.

In the example shown that supports both IPsec and MLSTP-based Stealth secured connectivity, an MLSTPGW driver 416 passes all IPv6 traffic from a physical network to the upper layer for processing. This can be, for example, based on a registry setting accessible to the MLSTPGW driver 416, indicating that another Stealth/security construct is being used by the endpoint. In example embodiments, the MLSTPGW driver 416 is generally a filter driver that intercepts IP traffic and is used to manage communications over MLSTP tunnels. Regarding the prioritization of IPsec vs. MLSTP as noted above in connection with FIGS. 1-2, in the embodiment shown, the MLSTPGW driver 416 initially allows for traffic to flow through that driver in cases where IPv6 is used, and where the system on which the MLSTPGW driver 416 is installed is at least a Windows 7 or other IPsec-compliant device. In such embodiments, initial IPv4 and IPv6 traffic passes through the MLSTPGW driver 416 and a TCP/IP stack, to the callout driver 410, to be blocked until an IPsec or MSLTP tunnel is established between the peers. The user level protocol service 406 will request the MLSTPGW driver 416 to attempt to establish an MLSTP tunnel for an IPv4 endpoint. This request is made using an IOCTL, and the MLSTPGW driver 416 is modified to implement this IOCTL. If an MLSTP tunnel is established, the MLSTPGW driver 416 informs the user level service 406 through another IOCTL. If the MLSTP tunnel fails for an IPv4 endpoint, instantiation of an IPsec tunnel is attempted, as noted above. It is noted that in some embodiments, if an IPsec tunnel cannot be established to a remote IPv6 endpoint, tunnel formation fails (i.e., no MLSTP tunnel may be available for IPv6).

The callout driver 410 is used to interface with the WFP, which is generally native in the Windows operating system of the system on which it is installed. The callout driver 410 sits above the MLSTPGW driver 416 and is also used to intercept all traffic based on how filters are configured in the WFP. The callout driver 410 is a Kernel level WFP callout driver. WFP callout drivers provide functionality that extend the capabilities of the Windows Filtering Platform. Callouts allow the callout driver 410 to examine network data in order to determine if/when an IPsec-based tunnel should be established. In some embodiments, the callout driver 410 is automatically started during system startup, and interfaces with the user level protocol service 406 via a set of IOCTLs.

During service start up or initiation of a Stealth connection, the user level protocol service 406 adds a provider and sublayer to the WFP system, and adds associated callouts with initial filters to the system (for both IPv4 and IPv6). An initial group of filters are added to allow traffic such as loopback, IPv4 subnet broadcast, IPv6 neighbor discovery, as well as protocol datagram units (PDUs) used to control the IPsec tunnels. In the embodiments discussed herein, there are six different Session PDUs used for tunnel initialization, keep alive and termination. The Session 0, 1 and 2 PDUs are exchanged during tunnel initialization, with Session 0 and Session 1 PDUs useable to pass authorization tokens that contain session keys wrapped with COI keys, an initialization vector, and a secure signature using SHA 384. The Session 3 PDUs (also called IDLE PDUs) are used as keep alive PDUs on the IPSec tunnel. Session 4 PDUs (also called TERM PDUs) are used for graceful shutdown of tunnels. Session 5 PDUs are special purpose versions of the Session 2 PDUs, used for specific control commands, as discussed below. Each PDU includes a SessionInfo header and SCIP header (except the Session 0 PDU used to initialize the session) as well as one or more options as discussed below. Options can include definition of IPSec transport attributes, IPsec mode attributes, IPsec perfect forward secrecy options, and a proxy tunnel option. Details regarding usage of these PDUs are provided in further detail below in connection with FIGS. 8-21.

Further, during service start up or initiation of a Stealth connection, an additional filter is added to the system so that all other traffic is called out for further examination by the callout driver 410. A service, such as a protocol service described below in connection with FIG. 6, then informs the callout driver 410 to enable IPsec-based Stealth using an IOCTL. The callout driver 410 enables secure processing by registering the callouts with the filter engine (e.g., via kernel level filter engine 409), to intercept inbound or outbound connect attempts. In some embodiments, the callout driver 410 intercepts inbound and outbound connections and transport layer traffic sent to or received from remote peers and queues the packets to a worker thread for processing.

The callout driver 410 maintains a structure for each remote endpoint it is communicating with, along with a global linked list of such endpoint connections. In some embodiments, a global hash table is maintained within the callout driver 410 to help search for a connection. Each endpoint connection entry in the list tracks pending connections or accepted received connection requests, and a packet queue that wait for an IPSec tunnel to be established. Once the IPSec tunnel is established by the login service, the callout driver 410 completes the pending operation and/or reinjects the packets back into the data path. The user level protocol service 406 sets up the IPSec tunnel such that once it is established, the driver callouts will no longer be invoked for data on this connection.

In general, the callout driver 410 performs a process for each packet that is received at the endpoint. Generally, the callout driver 410 will permit the packet if it was already previously inspected, or block the packet if the service is not initialized or there are no Global Service Events available (e.g., for sending IOCTLs to the user level protocol service 406 to handle the received packet). The callout driver 410 will then search its hash table, and create an entry. If a Stealth tunnel (IPsec or MLSTP) is already open, the packet is permitted. Otherwise the packet is initialized to be reinserted at a later time, and added to a connection list or packet queue, and the callout driver 410 then informs the user level protocol service 406 to initialize a tunnel to the remote endpoint identified by the remote IP address.

In operation, to initialize a Stealth tunnel (e.g., via IPsec) the user level protocol service 406 registers call out filters with a base filter engine 408, including various ALE layer and transport layer filters. The system then allows UDP Stealth-based port traffic, and notifies a user to provide logon credentials (e.g., from a windows login manager 418). The user level protocol service 406 connects to a user level logon service 407, which accesses a WGT file 420 that contains community of interest keys associated with the logged-in user, to determine if the user has rights to connect to a particular other endpoint (e.g., an endpoint that is attempting to connect to the current endpoint, or to which traffic is directed). At that point, driver filters are activated, for example via the base filter engine 408 and kernel level filter engine 409.

In the embodiment shown, an IOCTL message is passed to the user level protocol service 406 via IOCTL interface 412 that includes the IP address of the local and remote endpoints. The user level protocol service 406 will then respond, and with the user level logon service 407 will process the WGT file 420 to generate session keys for the tunnel to the remote endpoint. A UDP socket is opened to the remote endpoint, and session PDUs are exchanged, containing keys to be used for communication. If the exchange of session keys is successful, the user level protocol service 406 validates the exchange of keys used to generate a shared secret on corresponding endpoints, The shared secret, as discussed further below, is used to set the IPsec policy for the tunnel to be established. Because the shared secret is unique to each tunnel created, it allows for separate security for each IPsec tunnel being established. Pending successful negotiation of an analogous process at the remote endpoint, the callout driver 410 then reinjects blocked data into the data path; because of the IPsec policy in place, that data is then transmitted over an IPsec tunnel to a remote endpoint.

For embodiments that are implemented using Windows-based systems, a Winsock interface 422 is used to establish UDP sockets between endpoints for exchanging protocol messages, such as the protocol datagram units (PDUs) discussed below, and a Cryptographic Next Generation (CNG) interface 424 provides a Windows-based user-mode encryption API to which the various Stealth-based systems of the present disclosure can be interfaced. Accordingly, a network application, shown as applet 426, can communicate with an endpoint while being secured using IPsec or MLSTP tunnels established by the user level protocol service 406, callout driver 410, and IPsec module 430 or MLSTPGW driver 416.

In general, and through use of the above-described connection sequences, it can be ensured that the endpoint implementing IPsec-based Stealth security will not respond to a remote endpoint without first determining that it is allowed to do so, based on review of communities of interest contained in WGT file 420, and based on filter rules defined using the base filter engine 408 and kernel level filter engine 409. Furthermore, because session keys are used to generate a shared secret between two endpoints in addition to use of communities of interest, even endpoints associated with users in the same community of interest will not be able to recognize communications between endpoints that have established a Stealth-based IPsec tunnel as noted herein. Additional details and illustration of these connection sequences are discussed in further detail below in connection with FIGS. 10-21.

In some embodiments, a configuration utility present on the endpoint can be used to firm a matching authorization server certificate filename for a given IPv6 authorization server URL. Additionally, a provisioning utility handles IPv6 addresses for the COI filters, and defines address ranges and port ranges useable for each particular COI of which the endpoint will be a member.

In example embodiments of the present disclosure, such COI filters can also implement controls over connections among endpoints. For example, CO filters can enforce compatibility among MLSTP-compatible and IPsec-compatible Stealth-based endpoints and associated authorization services. In such embodiments, an authorization server will use an XML-based message received in a request from an endpoint for COI keys (e.g., from user level logon service 407) to determine IP address ranges, including whether such ranges should be expanded. In some embodiments, the user level logon service 407 manages IP address ranges, port ranges, and IPv6 addresses, sending version information to the authorization server (so that authorization server can allocate address ranges appropriately).

In addition, in some embodiments, the IPsec-based authorized endpoints can be grouped into particular workgroups, and authorized through a specific authorization server. A consolidation utility can be used, for example on the endpoint, to associate an endpoint with a particular authorization server. Once authorization is complete for that endpoint at the desired authorization server, the user level logon service 407 and user level protocol service 406 issue an ADD IOCTL to the MLSTPGW driver 416, signaling to the user level protocol service 406 the start of work group tunnel processing (and the corresponding end of service tunnel usage).

Furthermore, in some embodiments in which MLSTP-based security remains implemented, the MLSTPGW driver 416 returns an IOCTL message to the user level protocol service 406 to indicate that the endpoint has a license. When the license tunnel is closed, the MLSTPGW driver 416 similarly sends an IOCTL message, via IOCTL interface 412, to the user level protocol service 406 to indicate that the endpoint is not licensed. In either event, the license is acquired before other tunnels (MLSTP or IPsec) can be established at the endpoint. In other embodiments, such endpoint licensing messages can be managed at the device via protocol service.

In still further embodiments, an applet 426 operating on the endpoint allows user-level display of connection status and control of user credentials. The applet 426 provides credentials to the user level logon service 407, which in turn provides those credentials to the user level protocol service 406 for purposes of COI negotiation. Once COI negotiation has completed via the Session PDU exchange disclosed in FIGS. 10-21 below, the Windows filtering platform is used to remove the Stealth service and driver from the IPSec tunnel path. Because of this, the data traffic passed over the IPSec tunnel cannot be tracked by the Stealth service or driver. Instead, IPSec statistics are gathered for all IPSec traffic via the Windows Filtering Platform and displayed by the applet 426. Tunnel counts are not displayed for individual IPSec tunnels on the endpoint via the applet status window.

It is noted that IPsec tunnels are unique between IP addresses. Because interfaces on endpoints can be configured with multiple IP addresses (i.e. IPv4, link local IPv6 and global IPv6), IPsec tunnels are displayed in the applet 426 with both the local and remote IP addresses.

In some embodiments, and as further discussed below, the user level logon service 407 can include or be associated with a prelogon service (as discussed further below in connection with FIG. 6), and can also manage particular modes useable by the endpoint for establishing Stealth-based connections to other endpoints. In such embodiments, the user level logon service 407 is used to wrap service keys from the registry and provide service tunnel access prior to user log on/Stealth enable.

The user level logon service 407 is responsible for wrapping service keys found in the registry of the endpoint, and returning these wrapped service keys to the MLSTPGW driver 416. In addition, the user level logon service 407 imports the service keys from service enclaves associated with that endpoint. The user level logon service 407 acquires a public key from the user level protocol service 406 and uses it to wrap each service key and return it to the user level protocol service 406 for further processing. The user level protocol service 406 unwraps the service keys using the private key and stores them in the Windows key store for use in establishing Stealth over IPSec tunnels.

In such embodiments, the user level protocol service 406 also rewraps the service keys using a SecureParser key retrieved from the MLSTPGW driver 416 and returns the newly wrapped keys to the MLSTPGW driver for use in establishing MLSTP tunnels prior to user logon. The user level protocol service 406 uses the service keys previously received from the prelogon service portion of the user level logon service 407 to establish tunnels to endpoints (i.e. domain controllers and/or authorization servers). As explained below, service keys are included in the AuthToken generated during session PDU exchange for each tunnel established. This allows the service to make use of any valid service key without having to reissue session PDUs. In alternative embodiments, a more general-purpose session key can be used rather than the SecureParser key to avoid requiring use of MLSTP-based systems at all.

It is noted that in various embodiments, the user level logon service 407 does not handle service keys and does not establish service tunnels. It is however, responsible for disabling and enabling service tunnel use. It disables service tunnel use once it has successfully completed authorization by calling the user level protocol service 406 with an Add WorkGroups request. It enables service tunnel use when a user logs off or Stealth is disabled by calling the user level protocol service 406 with a Delete WorkGroups request. As further explained below, the user level protocol service 406 may be configured to add global filters either during service startup or afterwards, based on whether the endpoint is configured to operate in an "always on" mode or an "on demand" mode.

Furthermore, if Stealth is enabled in VPN mode the Stealth service will not attempt to open IPv4 IPSec tunnels unless the tunnels are in the local subnet of the physical adapter and the MLSTPGW driver 416 will not wait for an indication from the Stealth service before initiating IPv4 tunnels across the VPN connection unless the endpoint is in the local subnet. When the endpoint is in the local subnet, IPv4 over IPSec will be attempted before the MLSTP tunnels are opened.

Figure 5:
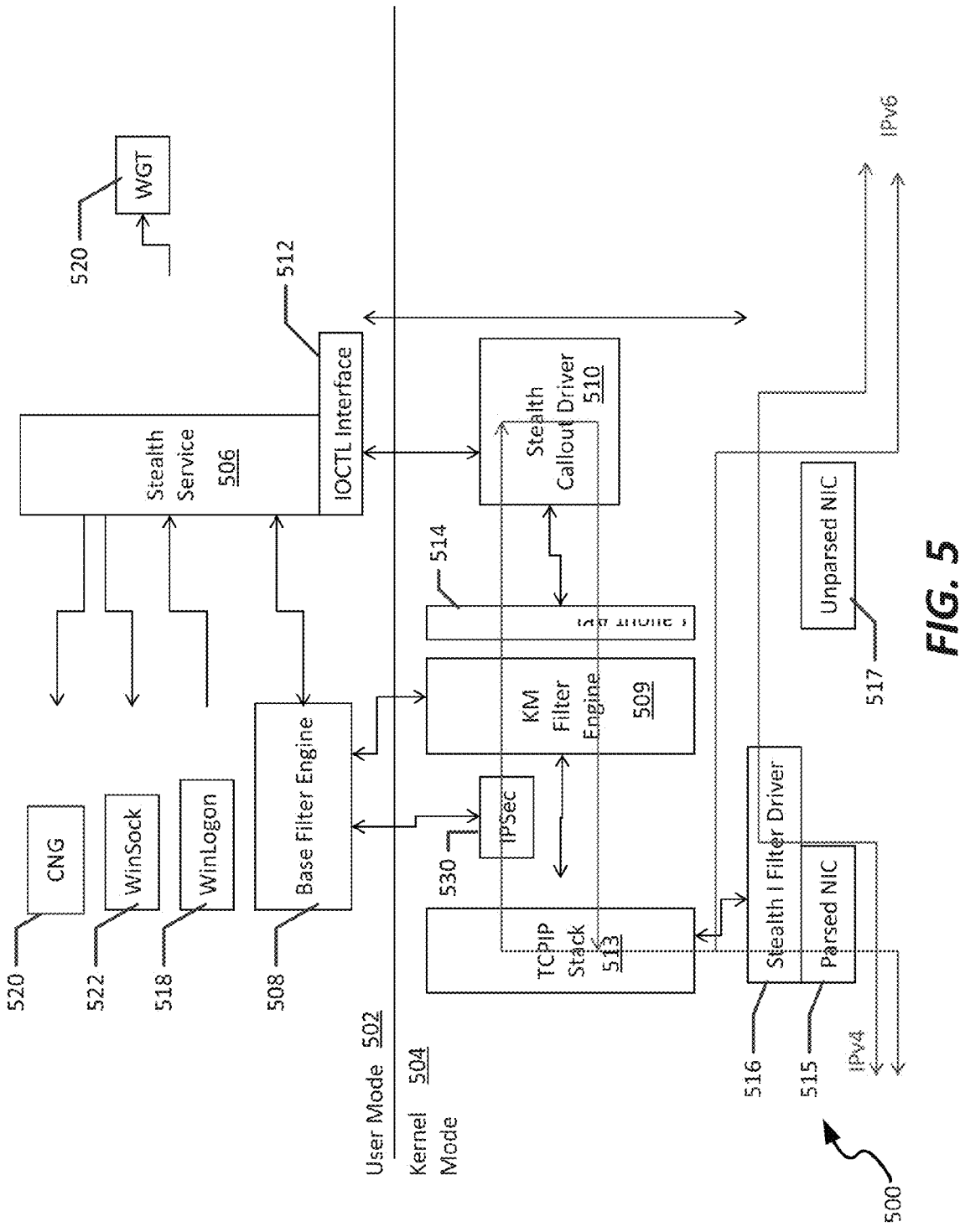
FIG. 5 is an example block diagram of relevant portions of a gateway appliance implementing a secured communications architecture including both legacy and internet protocol security (IPsec)-based security, as discussed herein.

Referring now to FIG. 5, an example block diagram of a system 500 for secure communications at a gateway implementing the internet protocol security (IPsec) implementation discussed herein is shown, in combination with an existing MLSTP-based Stealth implementation. Such a gateway could be used, for example, to provide IPv6-based addressing and IPsec-based security features for an otherwise unsupported endpoint, or to act as a gateway between secured and otherwise unsecured portions of a network.

Generally, the system 500 includes analogous elements to those in an endpoint (labeled with incremented reference numerals, as presented in a gateway rather than an endpoint), for establishing direct communications from the gateway. However, additional directional lines show passage of data traffic through the gateway between a protected (Stealth) network and a clear text (e.g., Internet-side) network. In the example shown, data transmitted between endpoints having IPv4 addresses pass through a MLSTP driver 516 of the gateway, and from a parsed network interface 515 to an unparsed network interface 517. IPsec-secured data is received at the parsed network interface 515 and passed through the MLSTP driver 516 as discussed above with respect to MLSTPGW driver 416; in this case, the IPsec-secured data is received at a TCP/IP stack 513, and routed through an IPsec encryption/decryption component 530 installed at the gateway (as opposed to the native functionality typically found in an endpoint as discussed above). The now-decrypted data passes through the filter engine 509 and exposed to the callout driver 510 via the API 514. The callout driver can then route the data, if appropriate, back through the TCP/IP stack 513 and to unparsed network interface 517 for communication as clear text. The filter engine 509, in combination with the callout driver 510 and user level service 506, prevents any data from being passed through the unparsed network interface 517 without first being ensured that it is intended to leave the "secured" side of the gateway.

Figure 6:
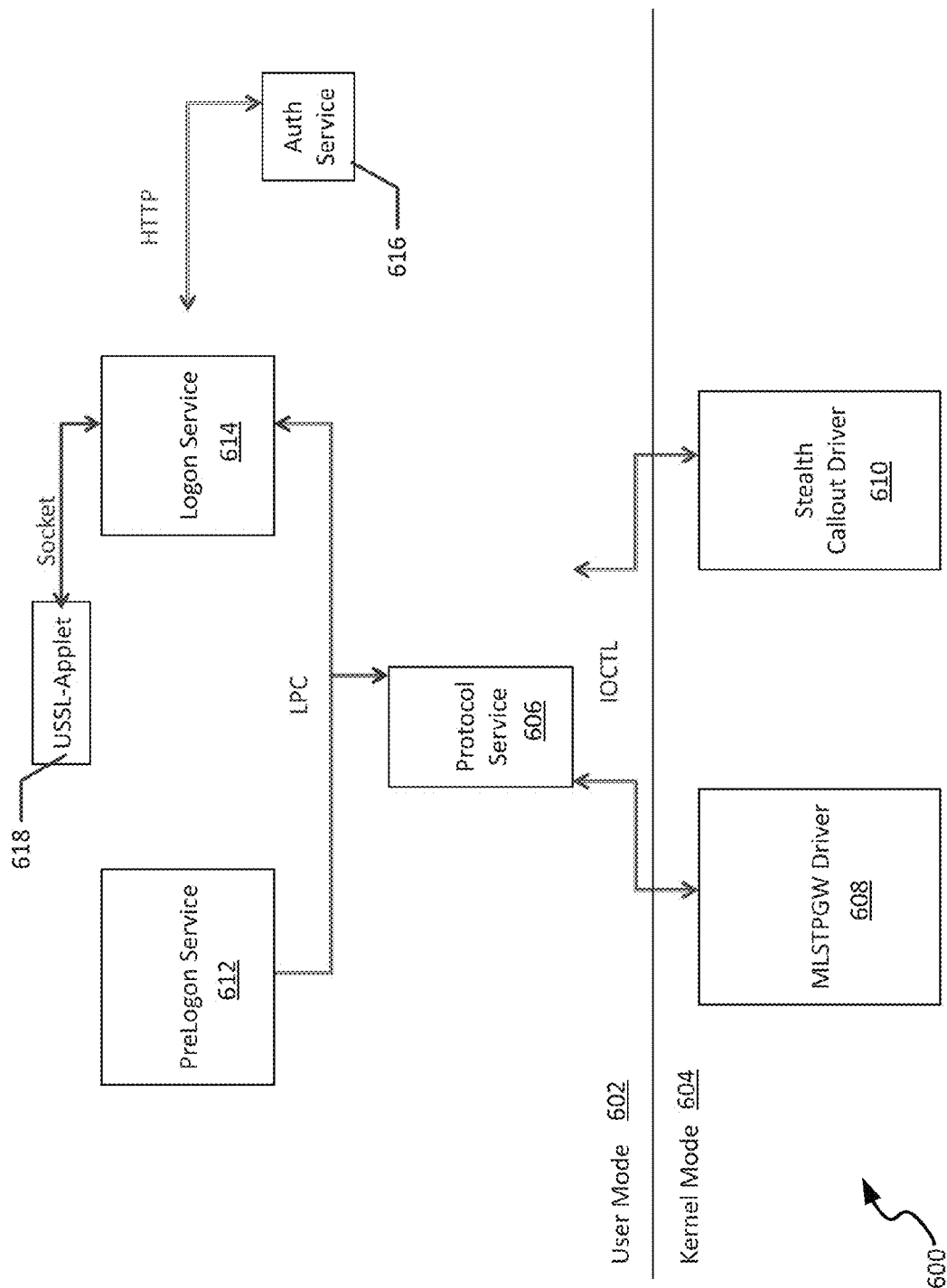
FIG. 6 is an example block diagram of a user level services system in operation on a computing device and implementing a secured communications architecture utilizing internet protocol security (IPsec), as discussed herein.

FIG. 6 is an example block diagram of a user level services system 600 in operation on a computing device and implementing the internet protocol security (IPsec) implementation discussed herein, in combination with an existing MLSTP-based Stealth implementation. In the example shown, the user level services system 600 depicts services operating in a user mode 602 that expose settings of drivers operating in a kernel mode 604. In particular, the settings allow a user to configure the endpoint to accomplish the secure communications configurations discussed above. For example, a protocol service 606 is interconnected to one or both of a MLSTPGW driver 608 or a callout driver 610. The protocol service 606 handles the tunnel initialization, termination, WFP interface and driver communications. Generally, the protocol service 606 provides the server side of an LPC interface while the prelogon service 612 and logon service 614 implement the client side of the LPC interface.

In example embodiments, the protocol service 606 creates the public/private key pair and returns a public key BLOB to a prelogon service 612. The prelogon service 612 wraps each service key in a service enclave and returns the wrapped keys with the other service enclave information (i.e. clear text keys, IP addresses etc.) to the protocol service 606. The protocol service 606 then unwraps each service key using a private key, and imports each service key into the Windows key store for use in establishing IPsec tunnels. In addition, protocol service 606 wraps each service key with a public key and forwards these keys with the other service enclave information to the MLSTPGW driver 608 for use in establishing MLSTP tunnels.

In the embodiment shown, the prelogon service 612 handles management of service enclaves used prior to user logon. In particular, the prelogon service 612 retrieves service keys from service enclave registry(s) and stores the enclave information. It then calls through the LPC (Windows RPC) interface to acquire a public key from the protocol service 606. Once the service enclave information has been successfully passed to the protocol service 606, the prelogon service 612 calls back into the protocol service 606 to release the public key.

In the embodiment shown, the logon service 614 handles the management of logon processing, user authorization (local or via an authorization server) and user communication via a USSL-Applet 618. The logon service 614 is responsible for handling user logon processing, for interfacing with an authorization service 616, for user authorization. The logon service 614 also is responsible for interfacing with the USSL-Applet 618 to provide tunnel status and handling enabling/disabling of Stealth connections (IPsec and MLSTP) and Stealth-based VPN connections. The logon service 614 can be configured to run in either client mode or server mode. In client mode it interfaces with a Win_Logon service to process user session notifications. In server mode, it uses the service credentials for user authorization. The logon service 614 supports the use of local WGTs (e.g., WGT file 420 of FIG. 4, in the case of an endpoint) or authorization through an authorization service interface, such as authorization service 616.

For authorization via an authorization service 616 the logon service 614 calls into the protocol service 606 to acquire the public key (from an RSA 1024 key pair). This public key is then wrapped with a certificate from the authorization server, which was stored at the endpoint during endpoint installation. The public key is then passed to the authorization service 616 in the HTTP request. The authorization service 616 unwraps the public key using its private key and then uses it to wrap the user's COI keys and return them to the logon service 614. The logon service 614 passes the wrapped COI keys to the protocol service 606, which unwraps each COI key using its private key and stores each in the Windows key store for use in establishing the IPSec tunnels. One example of using an authorization service in the manner generally described above to authorize a particular endpoint to establish a secure IPsec tunnel is illustrated in FIG. 16, described in further detail below.

In the embodiment shown, the USSL-Applet 618 is used on endpoints (e.g., client systems 204a-c) to display tunnel status for both IPv4 and IPv6 tunnels (e.g., as in applet 426). IPSec tunnel initiation is managed by the protocol service 606 on the corresponding endpoint. Once COI negotiation has completed via a session PDU exchange (discussed below in connection with FIG. 7), the Windows filtering platform is used to remove the user level service (e.g., user level protocol service 406 of FIG. 4) and callout driver (e.g., callout driver 410) from the IPSec tunnel path. Because of this, the data traffic passed over the IPSec tunnel cannot be tracked by the user level protocol service 406 or callout driver 410. Instead, IPSec statistics are gathered for all IPSec traffic via the Windows Filtering Platform and displayed by the USSL-Applet 618.

Referring to FIG. 6 generally, it is noted that the timing of when a particular endpoint is Stealth-enabled may vary depending upon the mode of that endpoint; for example, in some cases the endpoint may be set to an "always on" mode in which, at startup, the protocol service 606 adds initial global filters to the WFP to be used to callout traffic. In an on-demand mode, the global filters are not added during service startup, but rather the protocol service 606 does not enable global filters until after the logon service 614 enables Stealth or a Stealth-based VPN. Details regarding startup within a workgroup for these modes are discussed below in connection with FIGS. 8-9.

In some embodiments, the protocol service 606 manages network changes for the endpoint. This can include, for example changes to adapters or interfaces, as well as changes to IP addresses assigned to the endpoint or addressed by the endpoint. In example embodiments, the protocol service 606 registers callback functions through a Windows-based API to receive notifications from the operating system when a network adapter or IP address on the endpoint is modified, added or deleted. The protocol service 606 manages IPSec communications, using an IPsec transport mode and/or an IPsec tunnel mode, and manages filter objects as discussed below in connection with FIGS. 19-21, below. The protocol service 606 adds IPSec filters to the WFP so that Windows establishes the IPSec communications based on those filters and the stealth service and callout driver no longer see the traffic between the two endpoints.

In a transport mode, the Stealth tunnel is established by creating Security Associations in the IPSec module that define the traffic between the two endpoints. The Stealth tunnel uses its local session keys to establish IPSec traffic on the inbound connection and it uses the remote session keys to establish IPSec traffic on the outbound connection. The encryption session key is used for IPSec encryption while the validation session key is used for IPSec authentication.

In an IPSec tunnel mode, the Stealth tunnel is established by creating the filters and conditions and defining the endpoints of the IPSec tunnel. The IPSec interface to add an IPSec tunnel is called once the session exchange has completed. The IPSec tunnel is established using the shared key derived from the ECDH keys exchanged during the session initialization, as discussed in further detail below in connection with FIGS. 10-18.

For IP address changes, the protocol service 606 creates a server socket for each unicast IP address on an interface to listen for the Stealth session protocol PDUs (discussed further below). These sockets are created during service startup, but are enabled only when Stealth is enabled on the endpoint. In addition, the service sockets will close and open as the IP addresses change on the interface. The protocol service 606 uses the NotifyUnicastIpAddressChange IP Helper function available in Windows to register a callback for notifications when a unicast IP address is modified, added or deleted on an interface. The callback is registered to receive both IPv4 and IPv6 address changes. When the callback function is invoked, sockets may be closed or added depending on the type of notifications (i.e. delete/add).

For network interface changes, the protocol service 606 uses the NotifyIpInterfaceChange IP Helper function to register a callback for notifications when an interface is modified, added or deleted. When the callback function is invoked for a newly added interface, a new IOCTL interface to the MLSTPGW driver 608 is used to determine if Stealth is enabled on that adapter. The new interface is sent to the MLSTPGW driver 608 with the interface LUID. The MLST-PGW driver 608 checks through its list of Stealth bound adapters looking for one with a matching LUID. If it finds a match it returns the IOCTL with a true Boolean result indicating Stealth is enabled on the adapter, otherwise it returns false.

If an interface is not Stealth enabled, the protocol service 606 adds a filter to the Windows Filtering Platform to allow traffic on the interface/adapter to pass through the TCPIP stack and not be callout by the callout driver 610.

Figure 7:
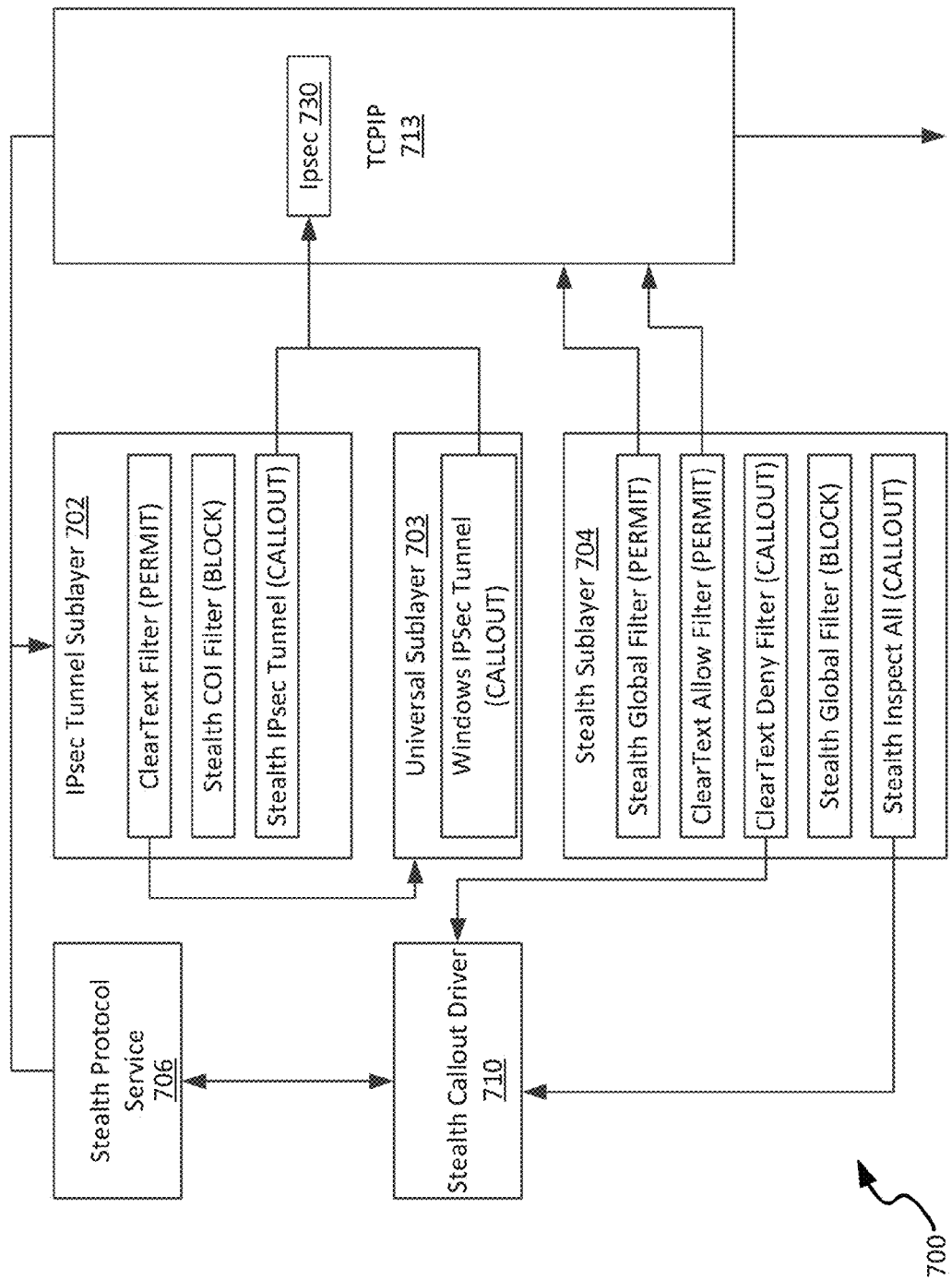
FIG. 7 is an example block diagram of a user level services system 700 in operation on a computing device and implementing the internet protocol security (IPsec) implementation discussed herein, without requiring an additional, existing MLSTP-based Stealth implementation.

FIG. 7 is an example block diagram of a computer system 700 in operation on a computing device and implementing the internet protocol security (IPsec) implementation discussed herein, without requiring an additional, existing MLSTP-based Stealth implementation. The embodiment as shown illustrates use of various sublayers and filters used in the Stealth IPsec-based Protocol (SCIP) used for communication among endpoints in an IPsec-enabled Stealth network. Such a system can be implemented using the Windows Filtering Platform, such as is illustrated in connection with FIGS. 19-21, below. In alternative embodiments, other implementations could be provided on other operating systems hosting native or guest IPsec implementations.

In the embodiment shown, the computer system 700 includes an IPsec tunnel sublayer 702, a universal sublayer 703, and a Stealth sublayer 704. Each of the sublayers is interconnected to one or more of a Stealth protocol service 706, a Stealth callout driver 710, and a TCP/IP protocol stack implementation 713, in which IPsec is implemented (shown as IPsec module 730).

In the example shown, various filters are included in sublayers 702-704, and are applied in a priority order within the sublayer. Generally, a CALLOUT or BLOCK filter in a sublayer stops traffic from passing to lower sublayers, while a PERMIT filter allows traffic to pass to a lower sublayer (where a different filter may be applied). In the example shown, the Stealth sublayer 704 includes a global PERMIT filter and a ClearText allow (PERMIT) filter, each of which pass data to the TCP/IP protocol stack implementation 713. The Stealth sublayer 704 also includes CALLOUT filters for Stealth and ClearText, which route messages to the Stealth callout driver 710. A Stealth BLOCK filter stops traffic received at the Stealth sublayer 704.

The IPsec tunnel sublayer 702 includes a ClearText filter that permits messages to pass to the universal sublayer 703, at which a Windows IPSec Tunnel filter passes messages to the IPsec module 730 for security. A Stealth IPsec Tunnel (CALLOUT) filter also routes messages to the IPsec module 730.

It is noted that the filtering of FIG. 7 is generally implemented after a Stealth-based connection is negotiated among endpoints that know they are both utilizing IPsec-based Stealth security. Connection sequences useable to establish and manage such connections are described in further detail below, in connection with FIGS. 8-21.

II. Example Connection States and Sequences for IPsec-Based Stealth Communication Referring now to FIGS. 8-21, various connection sequences and connectivity states are shown that enable communications between endpoints (e.g., client systems 204a-c, or between such systems and a licensing appliance (e.g., appliance 210) or an authorization server (e.g., server 206). The connection sequences described herein, as discussed below, ensure that each communication tunnel between endpoints is private to those endpoints, even within a particular community of interest. The connection sequences also ensure that, for endpoints that are not part of a particular community of interest, those endpoints appear "dark", meaning that they can be addressed, but will provide no response to requests for service (including responses denying such requests).

Figure 8:
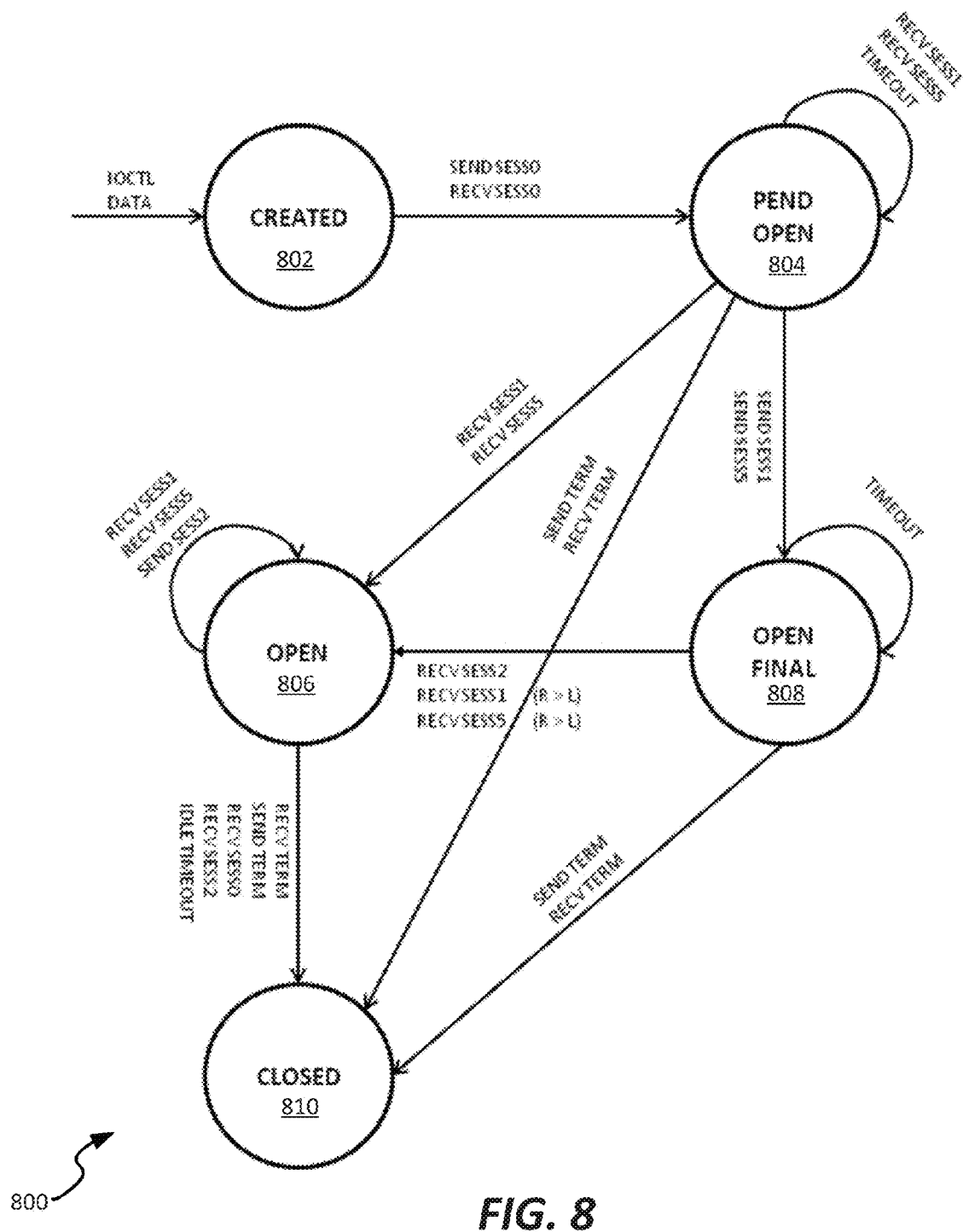
FIG. 8 is a state diagram illustrating states and state transitions utilized to initialize, maintain, and terminate a secure connection between endpoints secured using the methods and systems discussed herein.

FIG. 8 is a state diagram 800 illustrating states and state transitions utilized to initialize, maintain, and terminate a secure connection (tunnel) between devices secured using the methods and systems discussed herein. Generally, there are five states possible for a particular endpoint relative to a tunnel being created. These include a created state 802, a pending open state 804, an open state 806, an open final state 808, and a closed state 810. The endpoint will progress through the states 802-810 generally by passing various session PDUs for tunnel initialization, keep-alive, and termination.

In general, there are a plurality of different session protocol data units (PDUs) used to traverse states 802-810, and are referred to as Session 0-5 PDUs. Session 0, Session 1, and Session 2 PDUs are exchanged during tunnel initialization, while Session 3 PDUs are used as keep-alives, and Session 4 PDUs are used for termination of tunnels. Session 5 PDUs are used for special purpose communications in place of Session 1 PDUs, for example in the case where a particular endpoint is used as a proxy for another endpoint. Each of the PDUs generally includes a SCIP header (except for Session 0), which includes, generally, a number of flags defining connection settings, as well as a SessionInfo header, which defines a remote username, start time, session identifier, and various other options for creation of the secure tunnel. Discussion of each of the PDUs follows.

Session 0 PDUs are sent from an endpoint to begin initiation of an IPsec-enabled Stealth tunnel. These PDUs contain a list of the local session keys individually wrapped with each of the COI keys currently available in the WGTs. The encryption (ENC) key and public validation (VAL) key are both encrypted with the COI key before being passed in the authorization token (seen as AuthToken in FIGS. 10-19, below). In addition, the private VAL key is used to sign the AuthToken for validation on the remote endpoint. The remote endpoint must successfully decrypt the session keys before it can use the public VAL key for validation of the Session 0 PDU.

Session 0 PDUs are sent and received on the Stealth UDP port, so that they pass through the callout driver 410 undetected. In example embodiments each token entry in the Session 0 PDU is 128 bytes long so that no padding is required during encryption. In addition, the count of communities of interest is included to verify the length of an authorization token on the remote endpoint. In an example embodiment, a Session 0 PDU can take the format:
Sess.0::=UDP(<CTPort>,(AuthToken))

In various embodiments the Session 0 PDU can include an 8-bit bitmask of the cryptographic protocol versions (PDU formats and/or behaviors) supported by the endpoint sending a Session 0 PDU. Alternatively, versions can be set by the endpoint sending a Session 1 PDU. Additionally, an 8-bit bitmask of supported cryptographic profiles indicating the algorithms, key sizes and other parameters used in subsequent Session 1 and Session 2 PDUs can be transmitted. Additionally, bitmasks can be tracked that define the protocol versions and profiles supported by a particular release level on a running operating system.

Session 1 PDUs are sent from a receiving endpoint in response to a Session 0 PDU that was successfully verified and decrypted using a COI key from the WGTs (e.g., WGT file 420, 520). The Session 1 PDU response contains an authorization token with the local session keys of the responding endpoint wrapped with the COI key that matched the COI key in the Session 0 PDU received, as retrieved from the WGT of the receiving endpoint. In addition, in some embodiments the Session 1 PDU contains a signature generated using a SHA 384 HMAC across all of the fields of the Session 1 PDU excluding the signature field and generated using the local VAL private key. This allows for creation of a public/private key pair that can be used in a Diffie-Hellman key agreement arrangement. The public key can be returned to the requesting endpoint in the Session 1 PDU. Once the originating endpoint (U1) receives the public key of the second endpoint (U2), it uses that key along with its own ECDH P384 private key to generate the shared secret. In some embodiments, the Session 1 PDU also contains a SCIP (secure protocol) header and SessionInfo header. Session 1 PDUs can also be sent and received on the Stealth UDP port so that they pass through the callout driver undetected. In an example embodiment, a Session 1 PDU can take the format:

Sess.1::=UDP(<CTPort>, ^U.VAL:8:96, (IV:8*16, (SCIP-Header, AuthToken, SessionInfo)*U.ENC))

Session 2 PDUs are sent from an endpoint in response to a Session 1 PDU that was successfully verified and decrypted using the local session keys. The Session 2 PDU response contains a signature as well as a SCIP Protocol Header and a SessionInfo header, which contains the responding endpoint's (U1's) corresponding public key, which the opposing endpoint U2 can also use in an analogous manner to generate the shared secret at U2 for IPSec tunnel establishment. Upon completion of the Session 2 PDU, a Diffie-Hellman key agreement is performed, allowing for generation of a shared encryption key useable for IPsec communications that is not actually exchanged, but rather based upon the generated and agreed-upon shared secret. As with Session 0 and Session 1 PDUs, Session 2 PDUs are sent and received on the Stealth UDP port so that they pass through the callout driver undetected. In an example embodiment, a Session 2 PDU can take the format:
Sess.2::=UDP(<CTPort>, ^U.VAL:8:96, (IV:8*16, (SCIP-Header, SessionInfo)*U.ENC))

Session 3 PDUs, or keep-alive PDUs (seen in FIGS. 8-16 as "IDLE") are periodically transmitted from a Stealth endpoint as a keep alive on an open IPSec tunnel. Each Session 3 PDU contains the SCIP header, Age, Lifetime and TTL and SessionInfo header. The Session 3 PDU does not contain the user key in the SessionInfo header. This is because the Session 3 PDU is not encrypted—instead, it is sent over the IPSec tunnel. This allows the remote endpoint to detect that a tunnel has terminated without a Session 4 PDU (i.e. due to a network failure) because keep alives are no longer being received. Session 3 PDUs are sent and received on the IPSec tunnel using the IPSec UDP port for Stealth traffic so that they pass through the IPsec tunnel. In an example embodiment, a Session 3 PDU can take the format:
Sess.3::=UDP(<IntPort>,(SCIPHeader, Lifetime:32, Age: 32, TTL:32, SessionInfo)).

Session 4 PDUs, or termination PDUs (seen in FIGS. 10-18 as "TERM"), are sent during orderly termination of an IPsec-based Stealth tunnel. An example of orderly termination is when the Stealth service is disabled via the USSL-Applet 618, or during a user log off. The Session 4 PDU contains a reason code and description to explain the termination reason. The Session 4 PDU is encrypted and signed in the same way as the Session 1 and/or Session 2 PDUs. As with the other PDUs, TERM PDUs are sent and received on the Stealth UDP port so that they pass through the callout driver undetected. In an example embodiment, a Session 4 PDU can take the format:
Sess.4::=UDP(<CTPort>, ^U.VAL:8:96, (IV:8*16, (SCIP-Header, Reason:16, Desc:16*123, SessionInfo)*U.ENC))

Session 5 PDUs are sent from a Stealth endpoint when that endpoint has matched on a COI received in a Session 0 PDU, but that endpoint wants to send some special options in return to the remote endpoint. This may be the case, for example, where an endpoint is configured with clustered IP addresses and one local IP address is acting as a proxy for another. In example embodiments, the Session 5 PDU maps to the Authorization token format for a first portion, but further contains a signature, response code bytes, and a reserved field. These fields also then include the endpoint's corresponding keys wrapped with the COI key matched in the received Session 0 PDU. Following the encrypted session keys is the SCIP and SessionInfo headers which are themselves encrypted using the local U.ENC key that is also contained in the session keys.

Generally, the Session 5 PDU is a response PDU and is identified by using the RspCode field in the clear text portion of the PDU to identify the PDU as a response PDU to the receiver. A Length field indicates the length of the encrypted data following the session keys. The SessionInfo contains options that can be used to transmit information about why the response was sent instead of the (more typical) Session 1 PDU. Currently the only Session 5 PDU used is a proxy response PDU, but the PDU format can be expanded to include other response types if needed in the future. In an example embodiment, a Session 5 PDU can take the format:
Sess.5::=UDP(<CTPort>, ^U.VAL:8*96, (1V:8*16, RspCode:8, Reserved:8, ((U.VAL:8*96, U.ENC:8*32)*COI#i, (SCIPHeader, SessionInfo)*U.ENC)))

Accordingly, the various sessions PDUs (other than the Session 0 PDU) can have a session information format as generally described as follows:
SessionInfo::=(U.ECDH:8*96, UserName:16*256, StartTime:8*32, SessionId:64, OptionCount:8, [Options]*OptionCount).

With that background, the various states in state diagram 800 are traversed as follows. Generally, upon receiving an IOCTL or data to be transmitted via a Stealth-enabled connection, the created state 802 is entered, indicating that a connection entry has been initialized for a particular tunnel to be created. Upon sending or receiving a Session 0 PDU, a pending open state 804 is then entered. The endpoint remains in the pending open state 804 if a timeout occurs, or if a Session 1 or Session 5 PDU is received after receipt of a Session 0 PDU. If a Session 1 or Session 5 PDU is received after a Session 0 PDU is sent, the tunnel enters an open state 806. The tunnel then remains in the open state 806 while Session 1 or Session 5 PDUs are received and Session 2 PDUs are sent.

Figure 12:
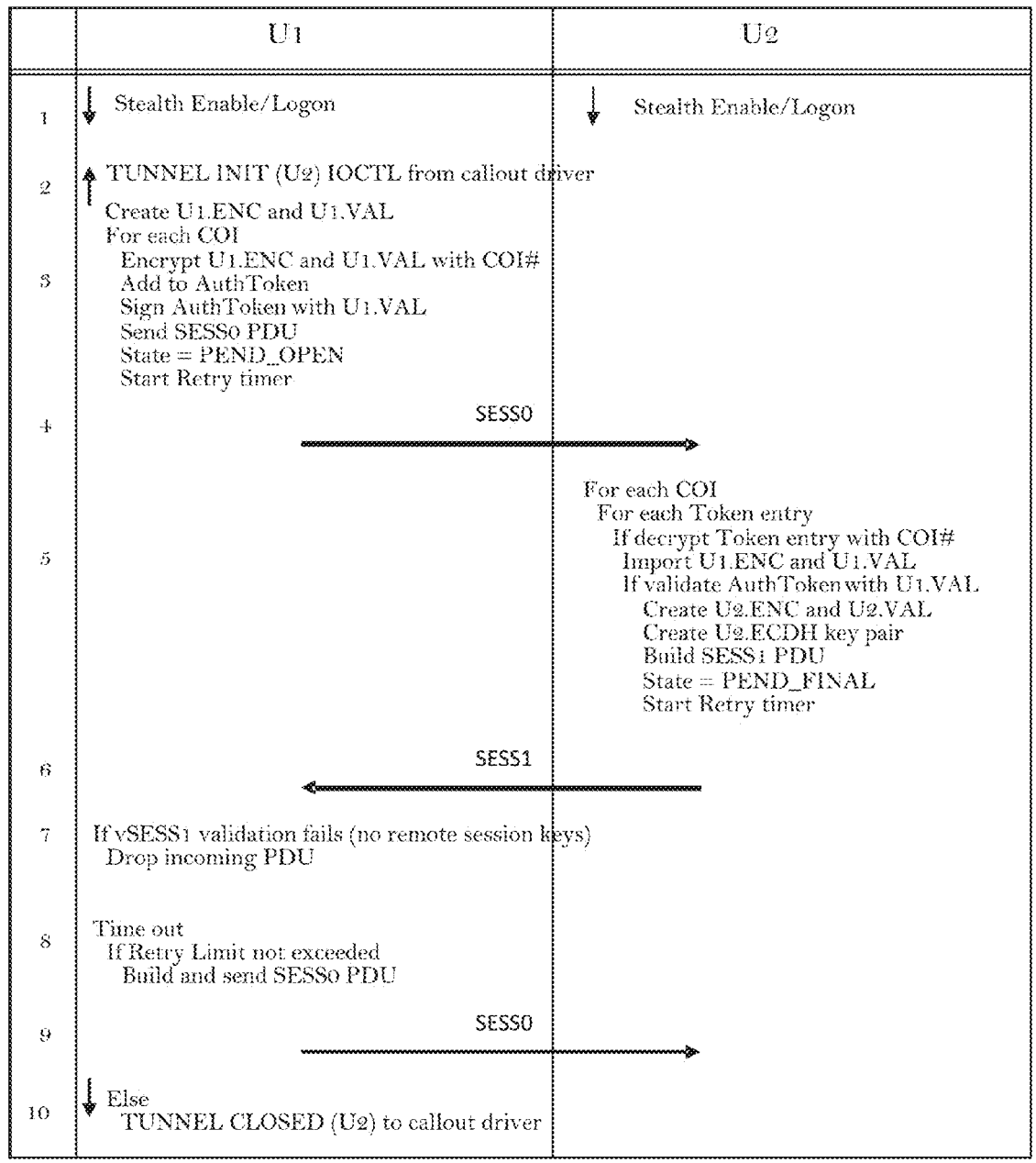
FIG. 12 is a message flow diagram illustrating a failed session initialization process based on a lack of remote session keys, according to an example embodiment of the present disclosure.

If, while in the pending open state 804 the endpoint sends a Session 1 PDU, the endpoint tunnel enters an open final state 808, in which it remains through timeouts, or until either (1) a TERM (Session 4) PDU is sent or received, in which case the endpoint tunnel switches to a closed state 810, (2) a Session 1 or Session 5 PDU is received with a different SessionID (i.e., a SessionID less than the SessionID regenerated by the local endpoint, to prevent collisions as noted in FIG. 12), or (3) or Session 2 PDU is received, in which the endpoint tunnel changes to the open state 806. If at any time a TERM (Session 4) PDU is received in any state (of states 804-808), the endpoint tunnel enters a closed state 810. Additionally, in the open state 806, receipt of a Session 4 PDU (TERM), an idle timeout, or receipt of a Session 0 or Session 2 PDU will cause the endpoint tunnel to enter the closed state 810.

It is noted that in some embodiments, the SessionInfo header may include information regarding IPsec tunnel attributes, which may be intercommunicated between two endpoints. This can, for example, allow the endpoints to negotiate at least a portion of the attributes of a given IPsec tunnel. Example tunnel attributes that may be varied or programmable could include, for example, the specific type of encryption used (e.g., AES-256), a specific authentication mechanism (e.g., SHA-256/AES GCM), whether to use Elliptic Curve cryptography, and the specific IKE version used could all be individually customized for a particular IPsec tunnel. These could be exposed to a user for setting, for example, by using the protocol service 606, which could allow a user or user-level application to set these and additional tunnel attributes. By allowing such tunnel attributes to be changed on a per-tunnel basis, additional flexibility is provided into the system for including computing systems having various IPsec implementations to be integrated (e.g., having different operating system implementations of IPsec, as may be present on Windows, Solaris, Linux, Macintosh, or other types of machines supporting IPsec). This ability to change settings, in particular at the application level (i.e., in user mode 602 at protocol service 606), also allows these machines to be integrated without associating an IPsec-based Stealth appliance with each such "nonstandard" computing system to ensure compliance.

In particular embodiments, session connectivity options can be set using one or more options for connection other than the tunnel attribute information. This can include, for example, use of an options array that allows for defining specific options and identifiers for those options, as part of the various PDU messages used for connectivity negotiations.

In one example, an IPsec transport attributes option defines the optional fields used to establish an IPsec tunnel in transport mode. For example, local and remote SPI fields can be used to establish a transport mode IPsec tunnel between the two endpoints. In transport mode, the Security Association (SA) of the IPsec tunnel is manually established and the local and remote SPIs must be exchanged between the endpoints to establish the inbound and outbound SAs on either side of the IPsec tunnel.

In a further example, an IPsec perfect forward secret (PFS) option can be used to define the PFS level in the IPsec tunnel. This option can be used to enable PFS when the default IPsec attributes for quick mode, main mode, IKE and IPsec mode are to be used to establish the IPsec tunnel. If no cryptography negotiation is being done, this option is set in a Session 1 PDU. If the remote endpoint can support the PFS level specified, it sets the level in the IPsec tunnel and returns the same value in the Session 2 PDU option. If the remote endpoint cannot support the specified level, it either returns the next level of PFS down, or does not return any option in the Session 2 PDU and PFS is not set in the IPsec tunnel.

If the release supports cryptographic feature negotiation, and such negotiation information is included in the session PDUs, then this option may not be included in Session 1 PDU, but rather PFS may be identified within the cryptographic profile included in the IPSec negotiation option, below.

In a still further example, an IPSec negotiation option defines the option used to pass cryptographic profile negotiation information between endpoints in both Session 0 PDUs and in Session 1 PDUs, allowing endpoints to negotiate the attributes used in the IPsec tunnel establishment. In the Session 0 PDU this option is appended to the authentication token. The presence of this option in the Session 0 PDU can be determined from the PDU length. In the Session 1 PDU, the IPsec negotiation option can be included in an option array that is included within the SessionInfo header.

Embodiments of the present disclosure which do not implement cryptographic negotiation will ignore these fields on the Session 0, or ignore the option in the Session 1 PDU.

Figure 9A:
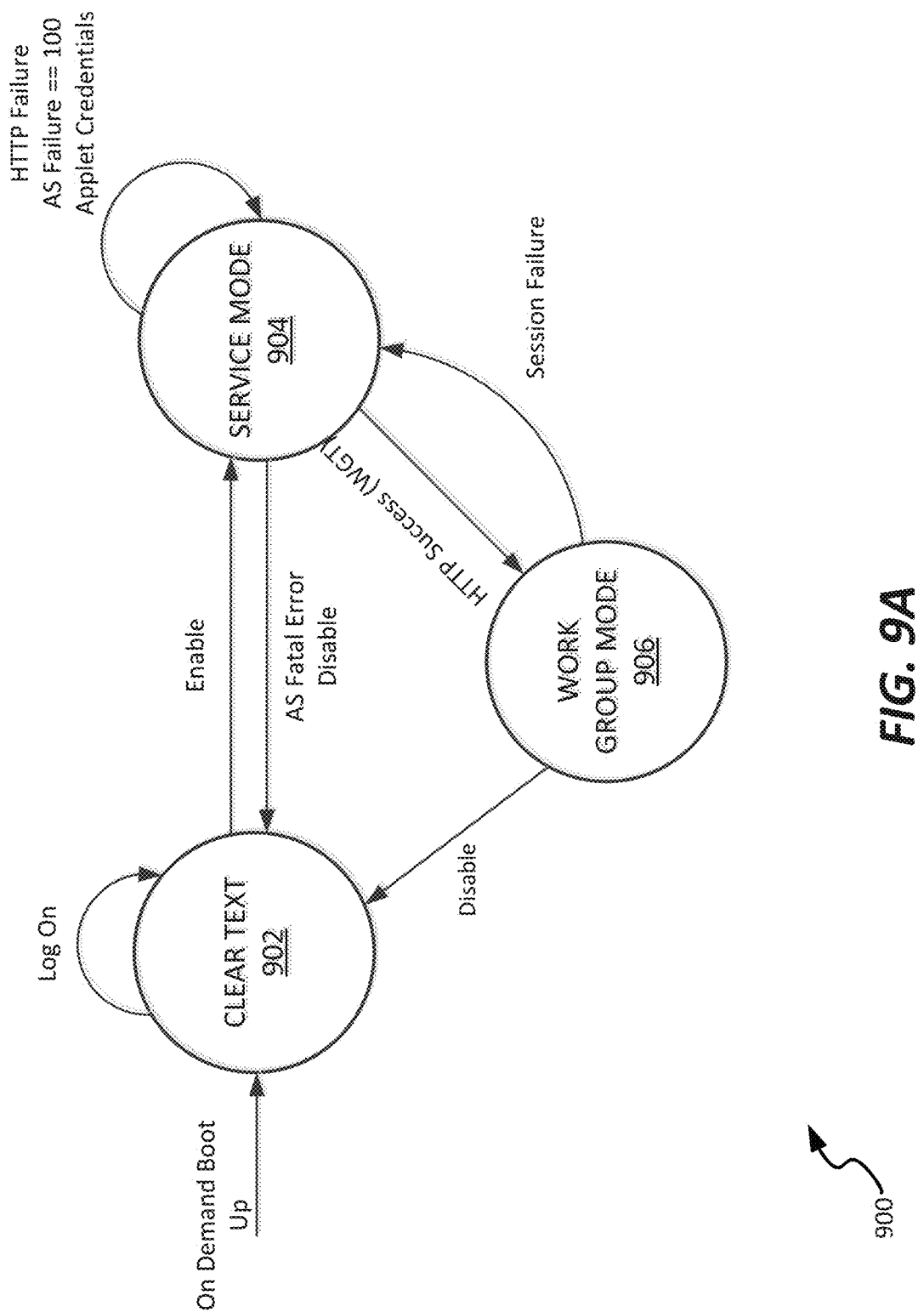
FIG. 9A is a state diagram illustrating states and state transitions utilized to initialize and maintain a workgroup membership associated with a secure connection between endpoints in an on-demand mode.
Figure 9B:
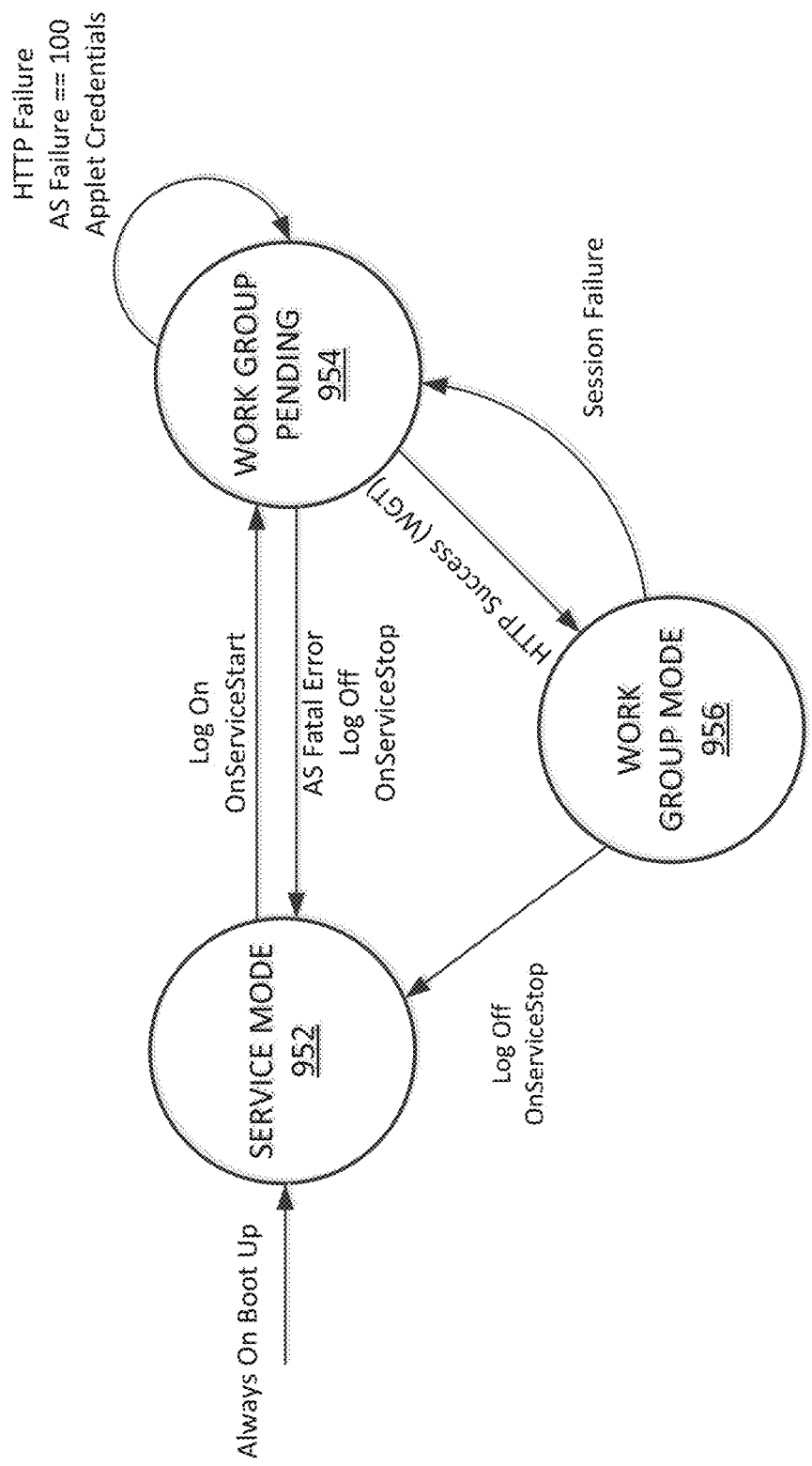
FIG. 9B is a state diagram illustrating states and state transitions utilized to initialize and maintain a workgroup membership associated with a secure connection between endpoints in an always-on mode.

Referring now to FIGS. 9A-9B, state diagrams illustrating states and state transitions useable to initialize and maintain workgroup memberships associated with a secure connection in either an on-demand or always-on mode, and associated with either a server role or a client role. In general, when endpoint software initializes and a connection is started (either an on-demand or always-on connection), the endpoint will attempt to establish a session with an authorization server and retrieve COI information using a <session><action><tuples> request. The endpoint includes a settings.xml file that identifies the set of authorization servers the endpoint can possibly connect with. The settings.xml file specifies the order in which an endpoint attempts to connect with an authorization service. An endpoint will sequentially iterate among authorization servers identified in settings.xml until a session is established. The endpoint is in "service" mode when attempting to establish a session with an authorization service. Connections are attempted by iterating through enclaves, ordering enclave access attempts using the <enclave> "order" attribute within the settings.xml file.

FIG. 9A is a state diagram 900 illustrating states and state transitions utilized to initialize and maintain a workgroup membership associated with a secure connection between endpoints in an on-demand mode. Generally, the states and state transitions illustrated in FIG. 9 can be used in either a server or client role. When the endpoint representing the server or client is booted, generally Stealth-based connections are disabled, and all communications are in clear text, shown as clear text mode 902. If a user logon occurs, it is ignored because Stealth communications are disabled, causing the device to remain in the clear text mode 902.

Upon enabling Stealth (e.g., using the methodology described above in connection with FIG. 8, and based on the flowcharts of FIGS. 10-21, below, a service mode state 904 can be entered. In the service mode state 904, the service keys and filters defined in the settings.xml file are utilized, such that in the service mode, a service mode key (rather than the full COI keys) are used.

After entering the service mode state 904, the endpoint initiates the HTTP tuple request to the authorization service. If the HTTP fails (e.g., due to a time out) retries are attempted based on the location of the authorization service (remote or local) and the way the endpoint is configured (server or client). In this state the endpoint cycles through the configured enclaves and authorization service URLs defined in the settings.xml until either an HTTP Request is successful, a failure is returned by the current authorization service, or all enclaves and URLs have been exhausted. If the HTTP is successful and WGTs are returned by the authorization service, the endpoint transitions to a work group mode state 906. In this mode the service COIs and filters in the settings.xml are no longer used and instead the WGT COIs and filters are used for Stealth communications.

If the session to the authorization service fails while the endpoint is in the work group mode state 906, the endpoint closes all open Stealth tunnels, returns to service mode state 904, (using the service COIs and filters) and reissues the HTTP Request to the current authorization server in an attempt to reenter the work group mode state 906. Stealth is not disabled during the session re-establishment.

If Stealth is disabled, for example by a user via the applet present at an endpoint, while the endpoint is in either service mode or work group mode, the endpoint closes all Stealth tunnels, disables Stealth (i.e. removes filters), and returns to clear text communications (shown as clear text mode 902).

FIG. 9B is a state diagram 950 illustrating states and state transitions utilized to initialize and maintain a workgroup membership associated with a secure connection between endpoints in an always-on mode. Similarly to the state diagram 900 for the on-demand mode, there are three state transitions when running in the always-on mode, either as a server or client system. After boot up (or service restart), Stealth is enabled in service key mode (shown as the service mode state 952) and all communications are done using the service COIs and filters defined in the settings.xml. In this mode Stealth cannot be disabled via the applet present at the endpoint.

When a user logon occurs or when the service starts and is running in server mode, the endpoint enters a work group pending state 954. Technically this is still service key mode but it is used to distinguish modes during the authorization process. After entering work group pending mode, the endpoint initiates the HTTP tuple request to the authorization service. Authorization retries and failures are handled in the same way for both Always On and On Demand modes of operation.

If the HTTP is successful and WGTs are returned by the authorization service, the endpoint transitions to work group mode, shown as the work group mode state 956. In this mode the service COIs and filters in the settings.xml are no longer used, and instead the WGT COIs and filters are used for Stealth communications. If the session to the authorization service fails while the endpoint is in work group mode, the endpoint closes all open Stealth tunnels, returns to work group pending mode (using the service COIs and filters) and reissues the HTTP Request to the current authorization service.

If a fatal response is returned by the authorization service, the endpoint closes all tunnels and returns to service mode state 952 but does not attempt to re-authorize. On client endpoints the user must log off and log on under a valid user to retry authorization. In server mode the Stealth services must be restarted to retry authorization.

In example embodiments, each endpoint established as a client or server in an on-demand or always-on configuration can have one or more plurality of attributes, including a configurable keep-alive interval useable to establish frequency of messages used to maintain a secure session between endpoints, and a grace period before which an authorization service session is closed after no keep-alive message is received. Per endpoint mode (client or server), each endpoint can be configured in an always-on or on-demand configuration.

Referring to FIGS. 8-9 generally, and back to FIGS. 4-7, it is noted that in some embodiments, it may be desirable to implement a user interface via a remote desktop protocol (RDP), or some other administrator-selected, predetermined IP-based protocol. In such cases, a clear text filter allows access to the endpoint which is doing the RDP is defined in both the settings.xml and the WGTs via an enterprise management system, to allow the RDP session to remain open both during the authorization process and after Stealth has been authorized and fully enabled.

The applet resident on the endpoint is used to prompt the user for credentials if the type of authorization requires full credentials in the tuples request. Examples of when full credentials are required are for integrated windows authentication using a local logged on user when the authorization service requires domain credentials or when the type of authorization configured at the authorization service is using LDAP user authentication.

Below, Table 1 shows the supported configurations and expected behavior when using RDP to connect to the Stealth enabled endpoint:

TABLE 1

Connection Parameters for Endpoint Devices

| Mode | Stealth Log In | Windows Integrated | LDAP | RDP Log In | Console Log In After RDP | RDP Filters if CT |
|---|---|---|---|---|---|---|
| Server Always On | OnServiceStart If (IWA) use logon service credentials else (ldap) wait for applet and prompt for credentials | logon service credentials. If (HTTP fails) and (Applet running) prompt for credentials (i.e. domain log in). | Prompt for credentials | Stealth connection remains open using the current credentials. | Stealth connection remains open using the current credentials. | settings.xml. and WGTs |
| Server On Demand | Stealth is enabled via the Applet. | logon service credentials. If (HTTP fails) and (Applet running) prompt for credentials (i.e. domain log in). | Prompt for credentials | Stealth connection either remains open using the current credentials or can be enabled over the RDP connection via the applet. | Stealth remains in the same state (i.e. if enabled via RDP remains enabled). RDP session is closed by Windows. | settings.xml and WGTs |

TABLE 1-continued

Connection Parameters for Endpoint Devices

| Mode | Stealth Log In | Windows Integrated | LDAP | RDP Log In | Console Log In After RDP | RDP Filters if CT |
|---|---|---|---|---|---|---|
| Client Always On | Either OnServiceStart if user is already logged on or when user logs on. | logon service credentials. If (HTTP fails) and (Applet running) prompt for credentials (i.e. domain log in). | Prompt for credentials | If Stealth enabled RDP then credentials must match the logged on user credentials. | Logged on user credentials. | settings.xml and WGTs |
| Client On Demand | Stealth is enabled via the Applet. | logon service credentials. If (HTTP fails) and (Applet running) prompt for credentials (i.e. domain log in). | Prompt for credentials | Stealth connection either remains open using the current credentials (which must match) or can be enabled over the RDP connection via the applet. | Stealth is disabled and the RDP session is closed by Windows. | settings.xml and WGTs |

Referring now to FIGS. 10-18, various message flows are shown illustrating different effects of transmission of PDUs and associated data between endpoints, or between an endpoint and an authorization server, to enable IPsec-based Stealth communication tunnels to be created and used. As an initial example, FIG. 10 is a message flow diagram 1000 illustrating a successful session initialization process, according to an example embodiment of the present disclosure. In the message flow diagram 1000 as shown, an initial login/enabling action taken at both endpoints (U1, U2) is followed by a Tunnel INIT IOCTL message at U1. U1 creates encryption key ENC and public validation key VAL, and encrypts ENC and VAL with COI keys present at U1 for each COI of U1. These keys are added to an AuthToken, which is also signed by VAL. A Session 0 PDU is then transmitted to U2 including the AuthToken, and a state is updated to the pending open state 804. The Session 0 PDU can include, for example the various IPsec-based negotiation options discussed above that are supported at U1, and including supported protocol and cryptographic profiles.

In example embodiments, ENC can be implemented as an AES-256 key used for AES 256 CBC encryption, while VAL can be constructed as a ECDSA P-384 key pair used for signing and verification. Other embodiments are possible as well.

At U2, that endpoint treats the initial message as an unsolicited packet, and first determines if cryptographic communication data is present, allowing for negotiation of an IPsec-based connection using the cryptographic options information included in the Session 0 PDU. Additionally, a protocol profile is selected for use based on bits set in the options data included in the Session 0 PDU (e.g., a profile that allows for matched IPsec security across the endpoints. Once the Session 0 PDU is received, for each COI and associated token entry, the token is decrypted with a COI key, and the U1 encryption key and validation key are both imported. U2's encryption key and validation keys are then created, as well as an Elliptic Curve Diffie-Hellman (ECDH) key. If VAL is valid, a separate encryption key ENC and VAL are generated at U2, as well as a key pair. A Session 1 PDU is built including a responsive AuthToken and session ID, and data is encrypted with U1's ENC key (U1.ENC), signed with U1.VAL, and transmitted back to U1. The Session 1 PDU can also include an identification of the protocol profile that is selected at U2 based on the data received from U1.

At U1, upon receiving the Session 1 PDU, the received PDU is decrypted with U1's encryption key (U1.ENC), and for every COI in the WGTs, if one can be used to decrypt the AuthToken, the encryption key and validation key of U2 are imported. Additionally, the IPsec-based negotiation options received from U2 are imported, including a protocol version, protocol profile, and cryptographic profile. The AuthToken and Session 1 PDU are validated using the U2 validation key, and U2's Elliptic Curve Diffie-Hellman public key is also imported. A U1 Elliptic Curve Diffie-Hellman key pair is then created, and a shared secret is generated based on sharing of the U1 and U2 ECDH public keys (e.g., ECDH P-384 key pair used to generate a shared secret for IPsec tunnel establishment), respectively (once COIs are validated), and an IPsec tunnel is opened using the shared secret. An idle timer is then started. U1 then changes the tunnel state to an open state 806, and generates a Session 2 PDU to be transmitted to U2.

At U2, the Session 2 PDU is decrypted with U2's encryption key, and the Session 2 PDU and validation key are validated. The U1 Diffie-Hellman key is imported, and the same shared secret that was generated at U1 is then generated at U2. U2 then opens an IPsec tunnel, and the state of the tunnel at U2 becomes an open state 806, representing an established IPsec tunnel. An idle timer is then started at U2 as well.

FIG. 11 is a message flow diagram 1100 illustrating a failed session initialization process based on a lack of correct encryption/decryption keys, according to an example embodiment of the present disclosure. In the message flow diagram 1100, U2 receives the Session 0 PDU from U1, but the COI or validation fails. In this case, U2 simply drops the incoming PDU, and does not send a response (i.e., remains dark to U1). U1 can resend a Session 0 PDU one or more times, until a retry limit is reached, and then enters a closed state 810 if ultimately unsuccessful.

FIG. 12 is a message flow diagram 1200 illustrating a failed session initialization process based on a lack of remote session keys, according to an example embodiment of the present disclosure. In this example, U2 has the COI and validation keys that allow it to decrypt the Session 0 PDU; accordingly, it need not remain dark to U1. U2 transmits a Session 1 PDU to U1, which fails to validate the Session 1 PDU since it lacks remote session keys. The incoming PDU is then dropped at U1. U1 can then, as in message flow diagram 1100 of FIG. 11, retry a Session 0 PDU to restart opening an IPsec tunnel to U2 if so desired.

FIG. 13 is a message flow diagram 1300 illustrating a failed session initialization process after a tunnel between systems has been established, according to an example embodiment. In this arrangement, operation generally proceeds as in message flow diagram 1000 until U1 transmits to U2 the Session 2 PDU. At that point, if validation fails, the incoming Session 2 PDU is dropped. U2 transmits to U1 a retried Session 1 PDU, or if it has remote session keys, it can send a Session 4 (TERM) PDU to U1 to gracefully close the tunnel between U1 and U2.

Figure 14:
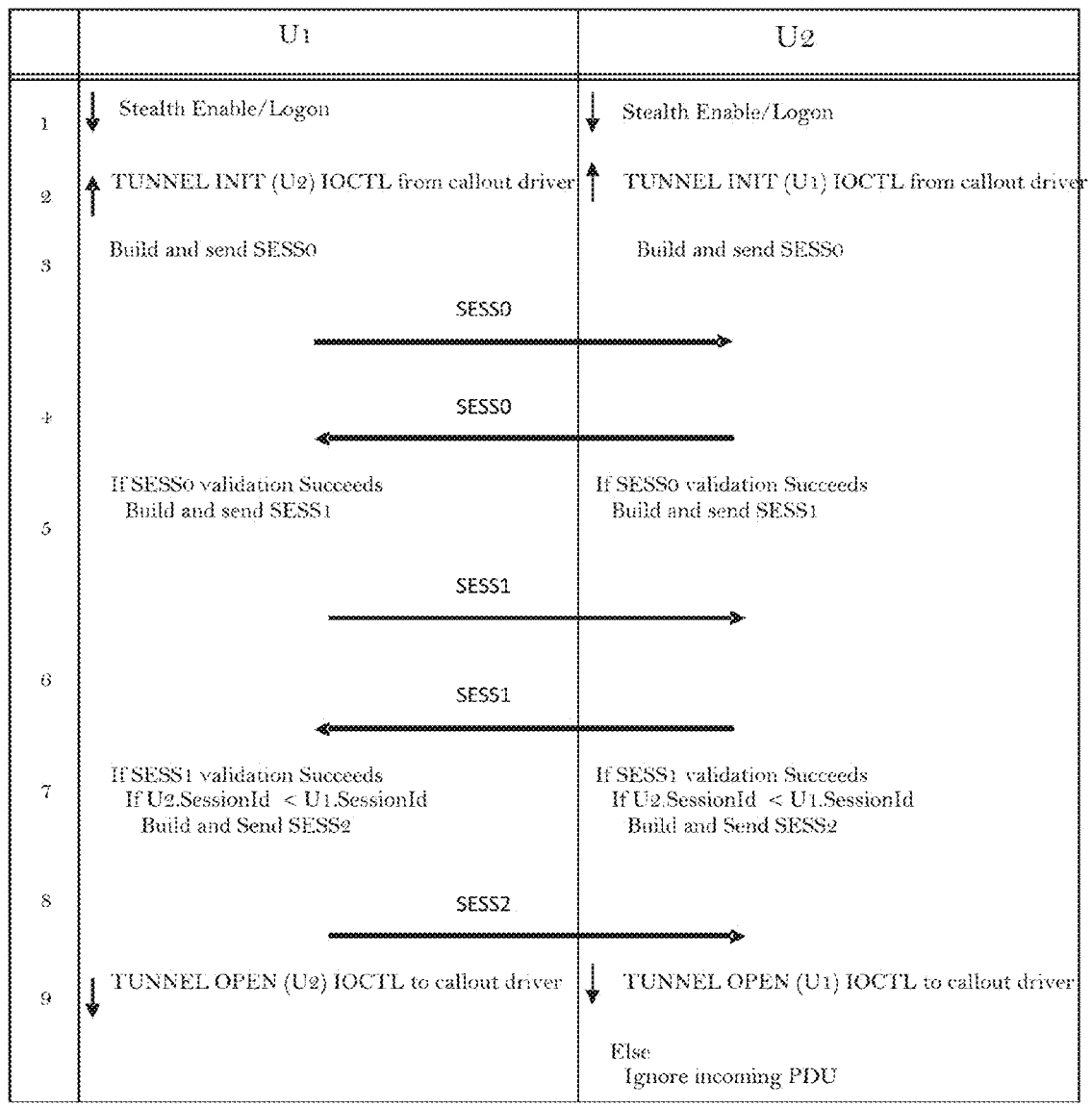
FIG. 14 is a message flow diagram illustrating a session collision, according to an example embodiment.

FIG. 14 is a message flow diagram 1400 illustrating a session collision, according to an example embodiment. In this arrangement, both U1 and U2 send Session 0 PDUs to each other. Both U1 and U2 would then, if successful in validating those Session 0 PDUs, exchange Session 1 PDUs. If Session 1 PDU validation is successful at each of U1 and U2, the endpoint with the lower SessionID will build and send to the other endpoint the Session 2 PDU to complete the IPsec tunnel opening process.

FIG. 15 is a message flow diagram 1500 illustrating a session keep-alive event, according to an example embodiment. As seen in FIG. 15, once an open tunnel is established (after the Session 2 PDU is successfully exchanged), an IDLE timer is started at each of U1 and U2. At the end of a timeout period defined by an IDLE timer, U1 will send to U2 a Session 4 (TERM) PDU to close the tunnel; however, if U1 wishes to maintain the tunnel it could send a Session 3 (IDLE) PDU to restart the IDLE timer, maintaining the tunnel in an open state 806 and useable to detect tunnel failures. Sending or receipt of an IDLE PDU can cause restart of the idle timers at U1 and U2, so long as the idle timeouts counter at each endpoint is not exceeded.

FIG. 16 is a message flow diagram 1600 illustrating a session termination, according to an example embodiment. In this example, a tunnel is opened, and at U1, a user opts to either disable the Stealth system or logs off the U1 endpoint. At that time, the COI keys become invalid, since the endpoint is no longer associated with a user in that COI. Accordingly, U1 builds and sends a Session 4 (TERM) PDU to close the tunnel, and the tunnel state is changed to a closed state 810.

FIG. 17 is a message flow diagram 1700 illustrating license and logging events in association with an open connection, according to an example embodiment. In this example, U1 is communicating with a Stealth appliance Appl1, which could be, for example, appliance 210 of FIG. 2, above. To connect to the Stealth appliance, U1 sends an IOCTL to the MLSTPGW driver 416, which initiates an MLSTP license tunnel request to be sent to Appl1. Appl1 transmits a response, opening a license tunnel. The MLSTPGW driver 416 then delivers an IOCTL message to the user level protocol service 406 indicating that the license tunnel is now open (which is a prerequisite to opening of tunnels to peer endpoints), thereby notifying the endpoint that IPsec tunnels can be opened. A logging event message is transmitted to the MLSTPGW driver 416, which builds and sends a Tunnel Open LOG PDU to Appl1, which writes the occurrence of any open tunnels into a system log.

Figure 18:
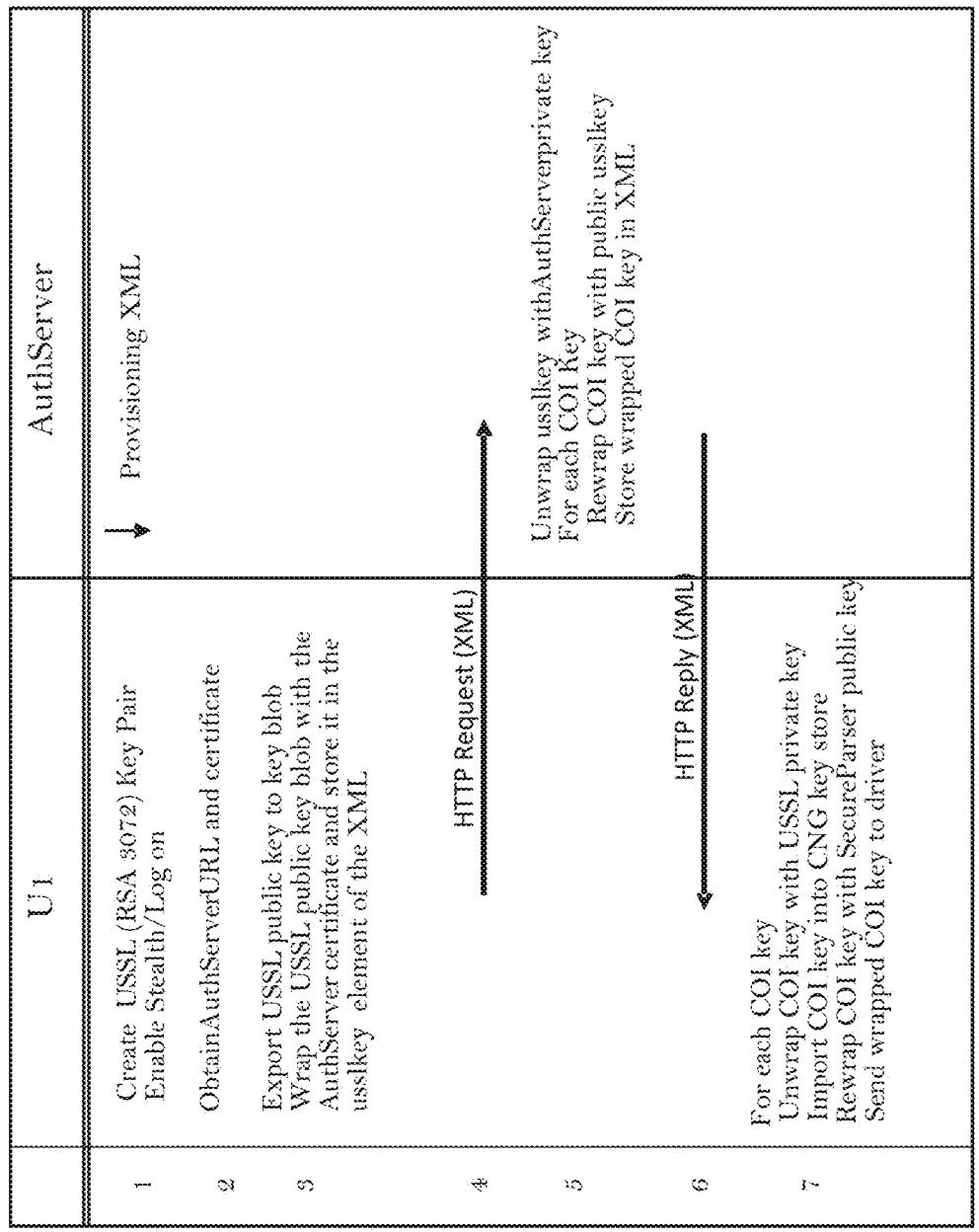
FIG. 18 is a message flow diagram illustrating a key exchange with an authorization server, according to an example embodiment.

As noted above in connection with FIG. 2, endpoints can also communicate with an authorization service, such as authorization service 211 on server 206, for receiving authorization from that server, and receiving COI keys that are to be distributed among the endpoints. Accordingly, FIG. 18 is a message flow diagram 1800 illustrating a key exchange with an authorization server, according to an example embodiment. In this message flow diagram 1800, the authorization service, represented by AuthServer, delivers COI keys to an endpoint U1 in response to U1 self-identifying to the authorization server. In particular, U1 transmits an HTTP request to AuthServer, which includes transmitting a USSL (RSA1024) public key as a key blob to the AuthServer, which decrypts the request with its private key. Each COI key to be returned to U1 is then wrapped in the USSL public key and returned to U1, which unwraps and imports each COI key, and also transmits to the MLSTPGW driver 416 the COI keys wrapped with a Secure Parser public key generated by the MLSTPGW driver 416. Accordingly, U1 will then have received its COI keys for both IPv4 and IPv6 communications, using either MLSTP or IPsec security constructs.

III. Example Filter Object Structure for IPsec-Based Stealth Communication

Figure 19:
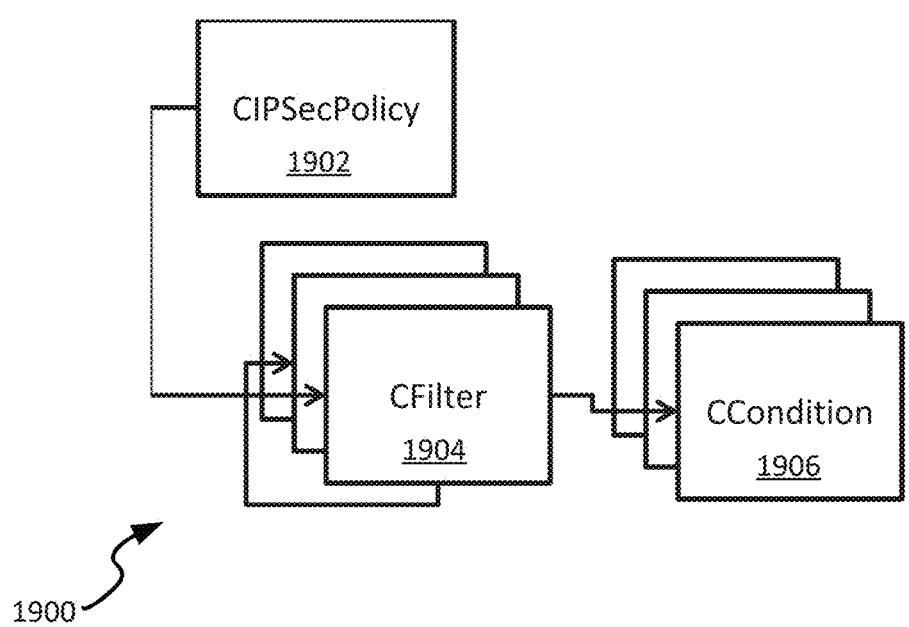
FIG. 19 is a block diagram of global filter objects useable to implement the secured systems and methods of the present disclosure.
Figure 20:
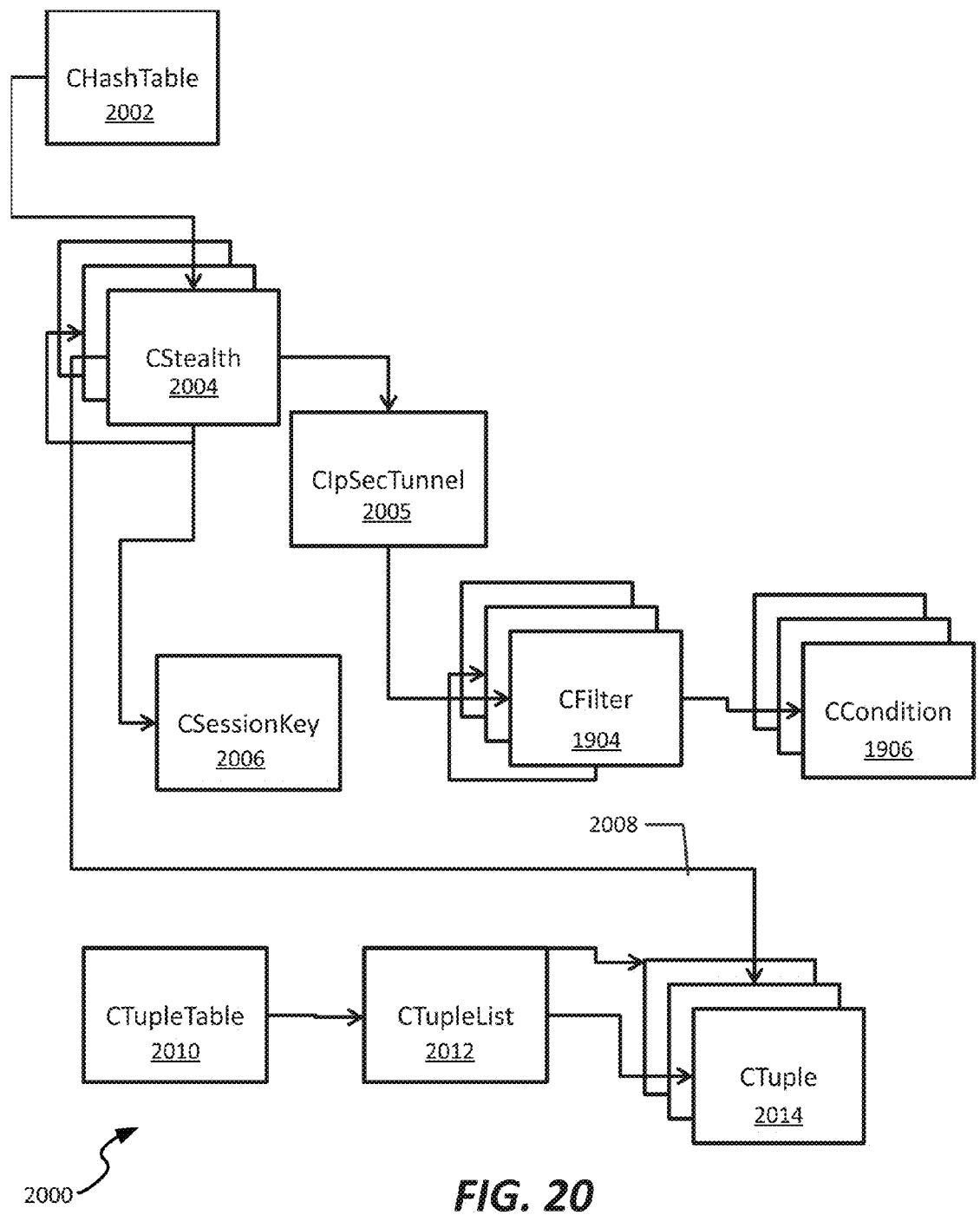
FIG. 20 is a block diagram of secure tunnel filter objects useable to implement the secured systems and methods of the present disclosure.
Figure 21:
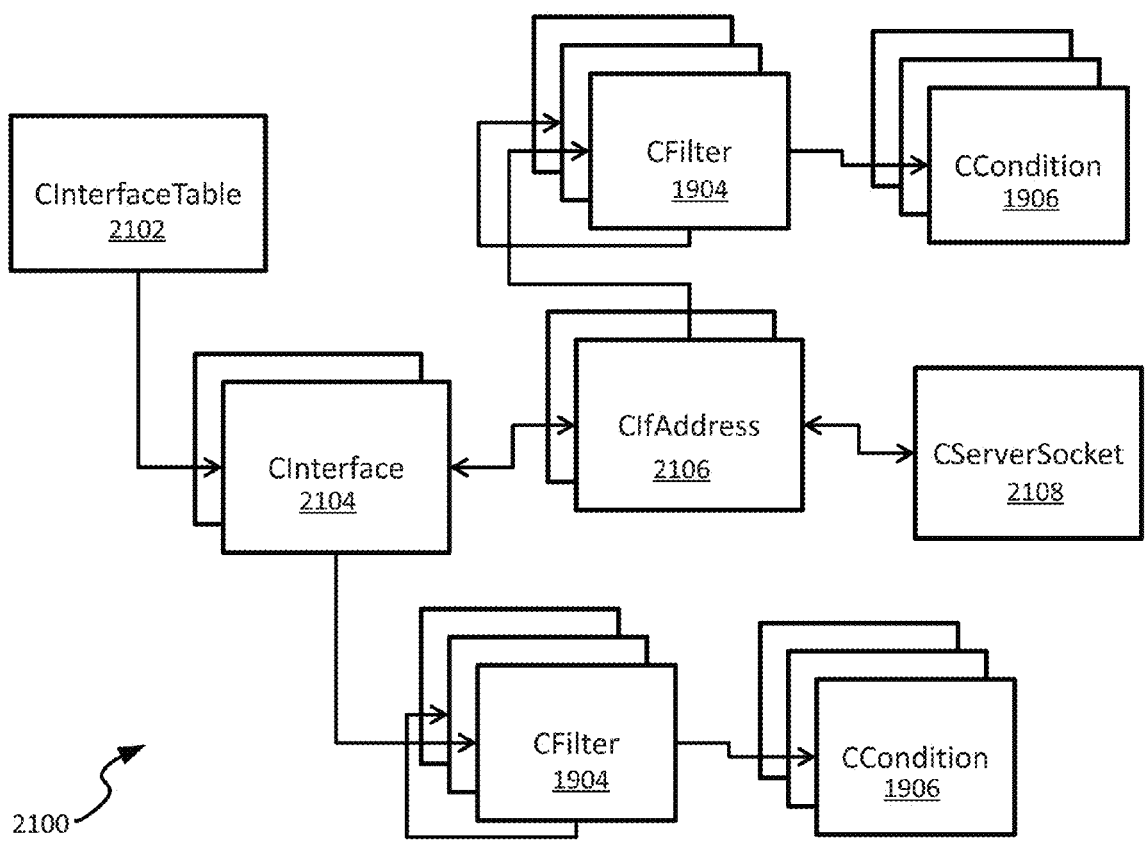
FIG. 21 is a block diagram of interface filter objects useable to implement the secured systems and methods of the present disclosure.

Referring now to FIGS. 19-21, various filter object classes are disclosed that can be used by the IPsec policy manager that can be instantiated and used to manage filters applied at a secured endpoint, for example to manage allowed traffic to/from the endpoint in the base filter engine (e.g., engine 408, 508, and kernel level filter engine 409). Such filter object classes can be used to manage various filters. Such filters can include various endpoint filters, including cleartext filters, IP address filters, and tunnel filters.

Clear text filters are global and can be converted to WFP filters when the WGTs are processed. These filters are not associated with specific tunnels. By adding these filters before tunnels open and giving them a higher weight than the callout filter and/or the IPSec tunnel filters, callouts for traffic that should be permitted are prevented (i.e. clear text allow filters).

"Allow access" clear text filters result in a WFP filter permits frames to pass through the filter engine unchanged. These clear text frames are not called out in the Stealth driver once the filter is added. An example clear text "Allow Access" filter including mixed IPv4 and IPv6 addresses could appear as follows:

```
<?xml version="1.0" encoding="utf-16"?>
<tuples codepage="437" version="2.7">
  <key id="Clear">
```

```
        <type>5</type>
        <hostIP>192.168.233.101</hostIP>
        <allowAccessList>
            <IPAddress type="ALL" name="*">
                <exceptFor count="2">
<IPAddressRange type="IPv4" lowName="192.168.233.104"
highName="192.168.233.108"/>
                    <IPAddress type="IPv6" name="2001:c0a8:f400::/48"/>
                </exceptFor>
            </IPAddress>
        </allowAccessList>
    </key>
</tuples>
```

"Deny access" clear text filters are covered under the global inspect all filter used to callout traffic to be sent via IPSec. When a deny access filter with an except for list is specified on a clear text COI, an allow filter is added to allow any traffic that meets the conditions of the "except for" list. In other words, the deny except for filter is equivalent to an allow filter. An example "deny access" filter could appear as follows:

```
<?xml version="1.0" encoding="utf-16"?>
<tuples codepage="437" version="2.7">
    <key id="Clear2">
        <type>5</type>
        <hostIP>192.168.233.101</hostIP>
        <denyAccessList>
            <IPAddress type="IPv4" name="192.168.233.0/*8" />
                <exceptFor count="1">
                    <IPAddressRange          type="IPv4"
lowname="192.168.233.102" highName="192.168.233.103" />
                </exceptFor>
            </IPAddress>
        </denyAccessList>
    </key>
</tuples>
```

IP address filters are applied to work group COIs that contain only IP addresses (no protocol or port specifications) . Because these filters are associated with a specific COI, they cannot be added to the WFP as global filters. Instead, these filters must be checked each time a new IPSec tunnel is being opened and the session PDU exchange must not complete if the IP address matches a deny filter. Once the COI is identified during the session exchange (i.e. in the Session 0 or Session 1 PDU) the COI is checked for filters. If the IPAddress is denied in the filter the endpoint receiving the PDU drops the incoming PDU and does not respond. Eventually, the remote endpoint times out and closes the tunnel. A TERM PDU is not generated because the session PDU exchange has not completed successfully due to the deny filter. An example IP address filter including a deny access list could appear as follows:

```
<?xml version="1.0" eneoding="utf-16"?>
<tuples codepage="437" version="2.7">
    <key id="Eng3">
        <type>0</type>
        <keyName>Eng3.BLO</keyName>
        <hostIP>192.168.233.101</hostIP>
        <denyAccessList>
            <IPAddress type="IPv4" name="192.63.0.0/*16">
                <execptFor count="2"">
                    <IPAddress type="IPv4" name="192.63.210.62"
                    <IPAddress type="IPv4" name="192.63.211.0/*8" />
                </exceptFor>
            <IPAddress>
```

```
        </denyAccessList>
    </key>
</tuples>
```

Because the Eng3 COI is the only available COI, this XML would result in the following filter being added to the WFP. Note that by adding this filter, the IP addresses denied in the filter will no longer be called out by the Stealth driver and will therefore never result in the establishment of an IPSec tunnel. In addition by using the BLOCK action on the filter the WFP will block all traffic defined by the conditions of the filter.

Tunnel filters correspond to filters on work group COIs that contain protocol or port specifications in addition to IP addresses. Tunnel filters are applied once the session PDU exchange results in a matching COI. The use of conditions on IPSec tunnels is limited and does not allow multiple protocols or multiple ports to be defined on an IPSec tunnel. Because of this restriction, the IPSec tunnel contains only a single condition which allows all traffic between the two endpoint of the IPSec tunnel but excludes the session PDUs transmitted using the Stealth port. In order to deny access to traffic not allowed by a COI filter, the COI filter is used to build blocking filters in the WFP between the two IPSec endpoints. These blocking filters are given a higher weight in the WFP than the IPSec filters so that they are applied to traffic between the two endpoints before the IPSec tunnel filters. This prevents traffic excluded by the COI filter from traversing the IPSec tunnel. An example allow access filter for a particular IP address and port could appear as follows:

```
<?xml version="1.0" encoding="utf-16"?>
<tuples codepage="437" version="2.7">
    <key id="Eng">
        <type>0</type>
        <keyName>Eng.BLO</keyName>
        <hostIP>192.168.233.101</hostIP>
        <allowAccessList>
            <IPAddress type="IPv4" name="192.168.233.200">
                <protocol name="TCP">
                    <port name="3389"/>
                </protocol>
                <protocol name="1"/>
            </IPAddress>
            <IPAddress type="IPv4" name="192.168.233.100">
                <protocol name="TCP">
                    <port name="3389"/>
                </protocol>
                <protocol name="UDP">
                    <port name="959"/>
                </protocol>
            </IPAddress>
        </allowAccessList>
    </key>
    <key id="Eng2">
        <type>0</type>
        <keyName>Eng2.BLO</keyName>
        <hostIP>192.168.233.101</hostIP>
    </key>
</tuples>
```

In the above example, when a COI match is made on a Session 0 PDU, before responding with a Session 1 PDU, the COI filter is checked. If the remote endpoints address is in the range of the deny filter, the responder drops the Session 0 PDU without sending a reply.

When a Session 1 PDU is received with a matching CO, before sending the Session 2 PDU response the COI filter is checked. If the remote endpoints address is in the range of the deny filter, the responder drops the Session 1 PDU without sending a Session 2 PDU reply.

Therefore, the Eng COI would not be included on any session PDU exchange except for the session exchanges to the 192.168.233.200 or 192.168.233.100 remote endpoints. All other session PDUs would include the Eng2 COI only.

In addition, once the Eng COI was used to establish an IPSec tunnel to 192.168.233.200, filters would be added to allow and to block traffic not allowed by the filter on 192.168.233.200, i.e., based on port and IP address ranges.

As seen in FIG. 19, a block diagram of an arrangement 1900 of global filter objects is shown, alongside the relationships between the objects used to manage global filters. For example, CIPSecPolicy 1902 contains a plurality of Cfilter instances 1904 (of both IPv4 and IPv6 varieties). Each CFilter instance 1904 can be used to create and manage filters added to the Windows Filtering Engine to enforce the policy for the Stealth tunnel. Each Cfilter instance 1904 points to the next CFilter, as well as its own CConditions 1906. CConditions 1906 corresponds to an array of conditions accessible via a Windows API.

As seen in FIG. 20, an arrangement 2000 of secure tunnel filter objects is illustrated. The use of conditions on IPSec tunnels is limited and does not allow multiple protocols or multiple ports to be defined on an IPSec tunnel. Because of this restriction, the IPSec tunnel contains limited conditions that allow all traffic between the two endpoint of the IPSec tunnel but excludes the session PDUs transmitted using the Stealth port.

In order to deny access to traffic not allowed by a COI filter, the COI filter is used to build blocking filters in the WFP between the two IPSec endpoints. These blocking filters are in some embodiments given a higher weight in the WFP than the IPSec filters so that they are applied to traffic between the two endpoints before the IPSec tunnel filters. This prevents traffic excluded by the COI filter from traversing the IPSec tunnel.

In the embodiment shown, the arrangement 2000 includes a CHashTable 2002, which is the hash table for creating, finding, querying and/or deleting a Stealth tunnel, and contains an array of 4096 hash table buckets. In the embodiment shown, each contains a linked list of CStealth entries 2004. Each CStealth entry 2004 contains a pointer to a CIpSecTunnel instance 2005, which is created from a CStealth entry 2004 and includes a single CIpSecTunnel once it has completed the session exchange. The CIpSecTunnel instance 2005 includes the Security Association for the IPSec tunnel, a linked list of CFilter instances 1904 that describe the IPSec tunnel filters and related COI filters. Each CIPSecTunnel instance 2005 contains a list of Cfilter instances 1904 and associated CConditions 1906. The CStealth entry 2004 also contains a pointer to the CSessionKey 2006 and a CTuple pointer 2008. The CTuple pointer 2008 is used to construct Session 0 PDUs as described above, and contains the last tuple stored in the Session 0 PDU. Once a session exchange has completed successfully, the CTuple pointer 2008 points to the tuple 2014 (i.e., the COI) matched on the remote endpoint.

The CTupleTable 2010 object contains the tuples lists for either the service enclaves or the currently logged on user. The CTupleList 2012 contains the number of tuples in the current list as well as pointers to the first and last CTuple instance 2014 in the list. The first tuple is used to start the processing for Session 0 PDUs and the CTuple pointer 2008 in the CStealth entry 2004 is used to pick up with the next tuple when the initial COI token contained the maximum number of COIs. The last tuple is used to add additional information from the XML to the tuple currently being processed in the XML file.

FIG. 21 is a block diagram of an arrangement 2100 of interface filter objects useable to implement the secured systems and methods of the present disclosure. In the embodiment shown, a CInterfaceTable 2102 contains a linked list of CInterface instances 2104. The CInterfaceTable 2102 is used to manage a list of all networking interfaces/adapters on the endpoint. The initial list is created when the Protocol service starts and is updated when notifications are returned by the operating system. The Protocol service registers a callback function during initialization in order to receive add/delete/modify notifications for interfaces/adapters. Each entry in the list represents a networking interface and contains list of unicast IP addresses. Each CIfAddress 2106 contains a pointer to the associated CServerSocket 2108, as well as to a separate CFilter instance 2104 (having a corresponding CCondition 1906). The CServerSocket 2108 points back to the CIfAddress 2106 as well, while the CInterface instances 2104 each also point to a CFilter instance 1904, which also references an array of CConditions 1906.

IV. Example Hardware and Virtualized Systems for IPsec-Based Stealth Communication Referring to FIGS. 22-24, example details regarding computing systems in which aspects of the present disclosure can be implemented are provided. Such computing systems represent optional emulated environments in which the methods and systems of the present disclosure can be implemented, for example using the hardware systems disclosed above in connection with FIG. 3.

Figure 22:
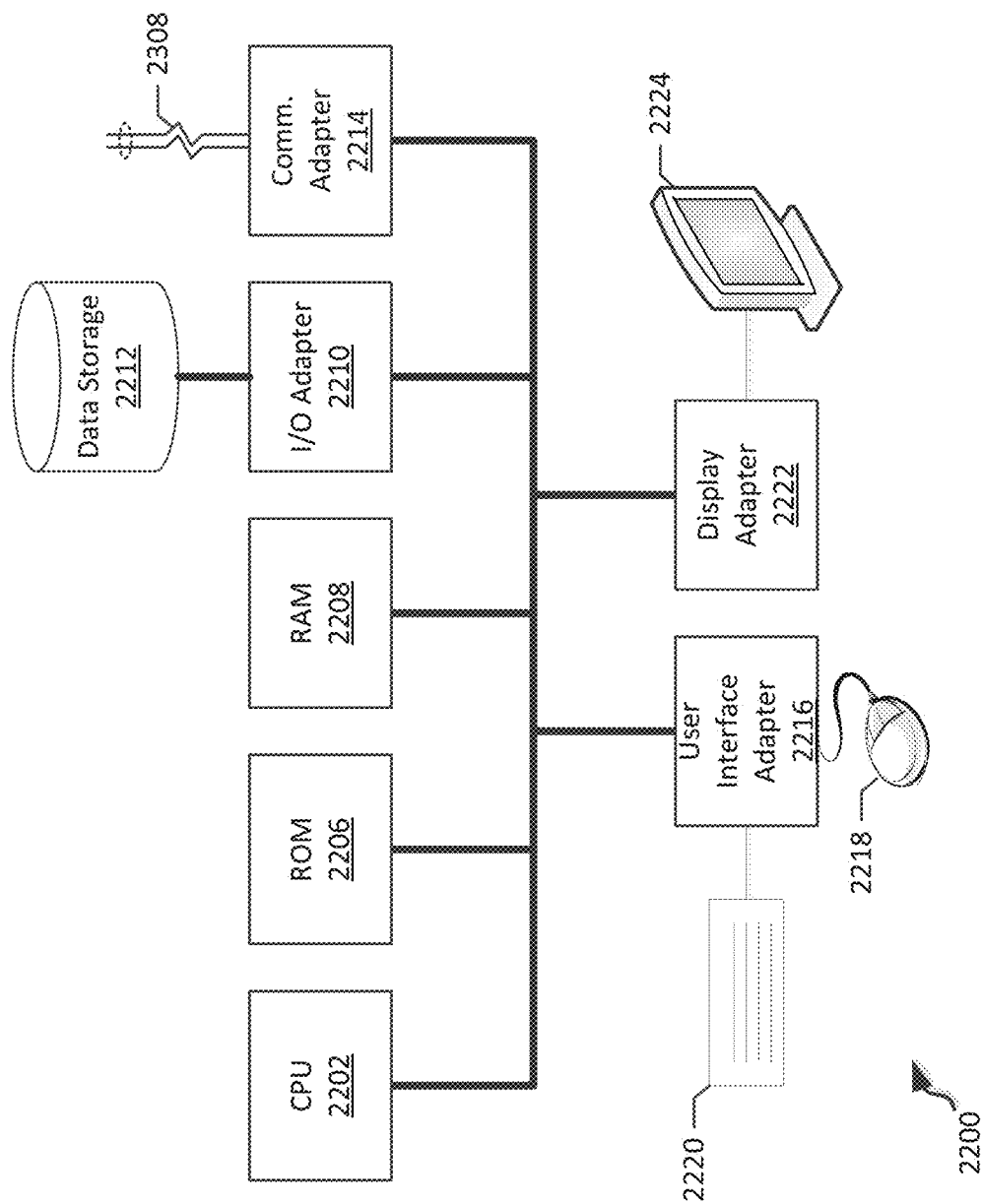
FIG. 22 illustrates an example computing system in which aspects of the present disclosure can be implemented.

FIG. 22 illustrates a computer system 2200 adapted according to certain embodiments of the gateway computing device, server and/or the user interface device. The central processing unit ("CPU") 2202 is coupled to the system bus 2204. The CPU 2202 may be a general purpose CPU or microprocessor, graphics processing unit ("GPU"), and/or microcontroller. The present embodiments are not restricted by the architecture of the CPU 2202 so long as the CPU 2202, whether directly or indirectly, supports the operations as described herein. The CPU 2202 may execute the various logical instructions according to the present embodiments.

The computer system 2200 also may include random access memory (RAM) 2208, which may be synchronous RAM (SRAM), dynamic RAM (DRAM), synchronous dynamic RAM (SDRAM), or the like. The computer system 2200 may utilize RAM 2208 to store the various data structures used by a software application. The computer system 2200 may also include read only memory (ROM) 2206 which may be PROM, EPROM, EEPROM, optical storage, or the like. The ROM may store configuration information for booting the computer system 2200. The RAM 2208 and the ROM 2206 hold user and system data, and both the RAM 2208 and the ROM 2206 may be randomly accessed.

The computer system 2200 may also include an input/output (I/O) adapter 2210, a communications adapter 2214, a user interface adapter 2216, and a display adapter 2222. The I/O adapter 2210 and/or the user interface adapter 2216 may, in certain embodiments, enable a user to interact with the computer system 2200. In a further embodiment, the display adapter 2222 may display a graphical user interface (GUI) associated with a software or web-based application on a display device 2224, such as a monitor or touch screen.

The I/O adapter 2210 may couple one or more storage devices 2212, such as one or more of a hard drive, a solid state storage device, a flash drive, a compact disc (CD) drive, a floppy disk drive, and a tape drive, to the computer system 2200. According to one embodiment, the storage devices 2212 may be a separate server coupled to the computer system 700 through a network connection to the I/O adapter 2210. The communications adapter 2214 may be adapted to couple the computer system 2200 to the network 2308, which may be one or more of a LAN, WAN, and/or the Internet. The communications adapter 2214 may also be adapted to couple the computer system 2200 to other networks such as a global positioning system (GPS) or a Bluetooth network. The user interface adapter 2216 couples user input devices, such as a keyboard 2220, a pointing device 2218, and/or a touch screen (not shown) to the computer system 2200. The keyboard 2220 may be an on-screen keyboard displayed on a touch panel. Additional devices (not shown) such as a camera, microphone, video camera, accelerometer, compass, and or gyroscope may be coupled to the user interface adapter 2216. The display adapter 2222 may be driven by the CPU 2202 to control the display on the display device 2224. Any of the devices 2202-2222 may be physical and/or logical.

The applications of the present disclosure are not limited to the architecture of computer system 2200. Rather the computer system 2200 is provided as an example of one type of computing device that may be adapted to perform the functions of a server and/or the user interface device. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 2200 may be virtualized for access by multiple users and/or applications.

Figure 23:
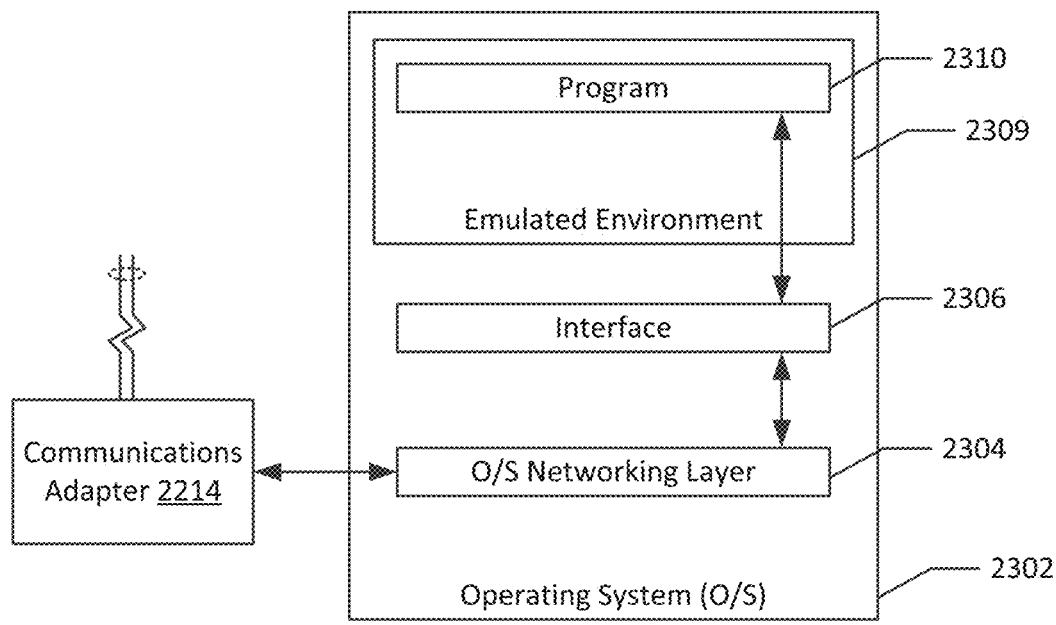
FIG. 23 illustrates an example virtualization environment implemented on a computing system, illustrating a mechanism by which private-domain and cloud-based virtual machines can be implemented.

FIG. 23 is a block diagram illustrating a server hosting an emulated software environment for virtualization according to one embodiment of the disclosure. An operating system 2302 executing on a server includes drivers for accessing hardware components, such as a networking layer 2304 for accessing the communications adapter 2214. The operating system 2302 may be, for example, Linux. An emulated environment 2309 in the operating system 2302 executes a program 2310, such as CPCommOS. The program 2310 accesses the networking layer 2304 of the operating system 2302 through a non-emulated interface 2306, such as XNIOP. The non-emulated interface 2306 translates requests from the program 2310 executing in the emulated environment 2309 for the networking layer 2304 of the operating system 2302.

Figure 24:
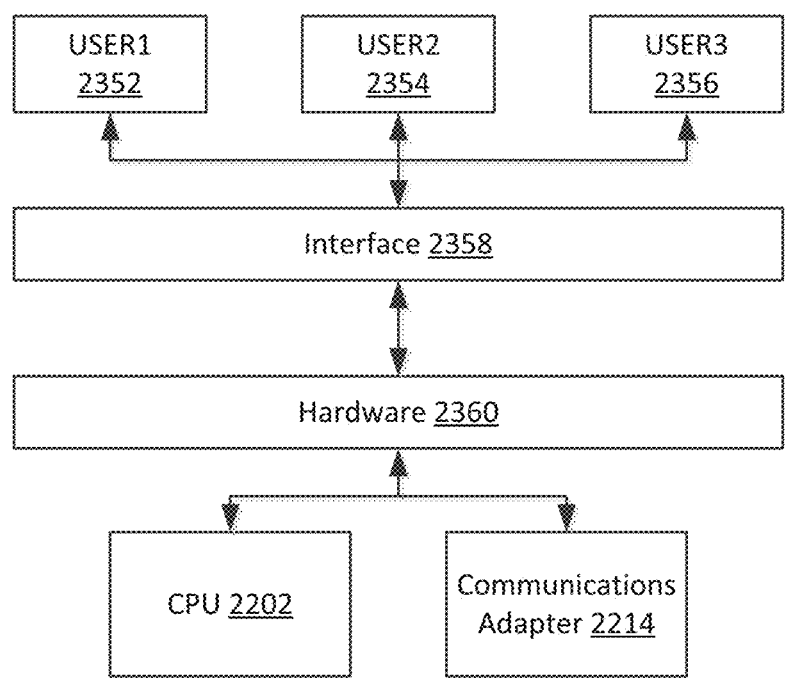
FIG. 24 illustrates an example multi-user computing arrangement illustrating shared computing resources across different partitions and/or virtual machines, according to example embodiments.

In another example, hardware in a computer system may be virtualized through a hypervisor. FIG. 24 is a block diagram illustrating a server hosting an emulated hardware environment according to one embodiment of the disclosure. Users 2352, 2354, 2356 may access the hardware 2360 through a hypervisor 2358. The hypervisor 2358 may be integrated with the hardware 2360 to provide virtualization of the hardware 2360 without an operating system, such as in the configuration illustrated in FIG. 22. The hypervisor 2358 may provide access to the hardware 2360, including the CPU 2202 and the communications adapter 2214.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Computer storage media generally includes at least some tangible, non-transitory media and can, in some embodiments, exclude transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media. In accordance with the present disclosure, the term computer readable media as used herein may include computer storage media, but generally excludes entirely transitory embodiments of communication media, such as modulated data signals.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

V. Summary and Example Applications for IPsec-Based Stealth Communication

Referring to FIGS. 1-24 overall, it is noted that in addition to the above functionality, it is apparent that specific applications may be made available using the IPsec implementation of Stealth as discussed herein. For example, the set of PDU definitions can be extended to provide additional functionality. In some embodiments, an additional set of PDUs could be exchanged between the AuthSvc and endpoint (e.g., endpoint U1) to allow an authorization service to remotely control the endpoint, or at least remotely administer the Stealth-based settings at that endpoint. Additionally, because of the user-level definition of Stealth in the IPsec implementation, additional user applications can be developed to control different aspects of the implementation, such as for VPN associated with particular COIs, or other applications. Further examples can include secured remote access to resources (e.g., storage, applications, virtualized desktops etc.) at a computing system or other endpoint having a common community of interest.

Still referring to FIGS. 1-24 generally, it is noted that the IPsec-based system of the present disclosure presents a number of advantages over both native IPsec and existing Stealth solutions. For example, due to the partially user-mode implementation of the IPsec-based Stealth solution, migration to different IPsec constructs is much simpler. Furthermore, in combination with the feature of configurable IPsec parameters, the present application allows Stealth to be installed on many systems that would be otherwise incompatible with the Stealth solution, while maintaining negotiation capabilities allowing fallback to a proprietary security protocol as needed. Simplified, application level security controls and truly dark endpoints to those entities or persons outside of the community of interest to that person provide still further advantages of the present system.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of managing secure communications states in an endpoint within a secure network, the method comprising:
   in a disconnected state, transmitting from a first endpoint to a second endpoint a first message including an authorization token, the authorization token including one or more entries, each entry corresponding to a community of interest associated with a user of the first endpoint and including an encryption key and a validation key associated with the first endpoint and encrypted with a corresponding community of interest key and entering a pending state;
   in the pending state, receiving from the second endpoint a second message including a second authorization token at the first endpoint, the second authorization token including one or more entries, each entry corresponding to a community of interest associated with the second endpoint and including an encryption key and a validation key associated with the second endpoint and encrypted with the corresponding community of interest key;
   based on receipt of the second message, entering an open state and initializing a tunnel between the first and second endpoints using an IPsec-based secured connection; and
   upon termination of the tunnel due to a termination or timeout message issued by at least one of the first and second endpoints, entering a closed state;
   wherein a community of interest includes a plurality of users having common user rights and segregating user groups by way of assignment of different cryptographic keys used for each user group, and any message from by an unauthorized endpoint that is not a member of the community of interested are not responded to in any way.

2. The method of claim 1, wherein in the open state, the method her includes:
   for each community of interest associated with the user and including the first and second endpoints, decrypting an associated entry in the second authorization token to obtain the encryption key and validation key associated with the second endpoint;
   decrypting and validating a public key to be used in a Diffie-Hellman key agreement algorithm;
   creating a key pair at the first endpoint and generating a shared secret based on the key pair and the public key received from the second endpoint;
   transmitting a third message including the public key created at the first endpoint to the second endpoint, thereby allowing the second endpoint to derive the shared secret; and
   initializing the tunnel between the first and second endpoints using the shared secret to derive encryption keys used for IPsec-secured communication between the first and second endpoints.

3. The method of claim 2, wherein messages passed within the tunnel remain obscured to a third endpoint having a community of interest in common with the first endpoint and the second endpoint.

4. The method of claim 1, further comprising, after initializing the tunnel, transmitting one or more keep-alive messages from the first endpoint to the second endpoint via the tunnel.

5. The method of claim 1, Wherein the second message further includes a signature, an encryption value, and one or more response codes identifying a status of the second endpoint to the first endpoint.

6. The method of claim 5, wherein the one or more response codes identify the second endpoint to the first endpoint as a proxy for a third endpoint.

7. The method of claim 1, further comprising, in the pending state, upon receiving a third message from the second endpoint that includes a third token including one or more entries, each entry corresponding to a community of interest associated with a user of the second endpoint and including an encryption key and a validation key associated with the second endpoint and encrypted with the corresponding community of interest key:
   transmitting a fourth message to the second endpoint, the fourth message including a fourth authorization token at the first endpoint, the fourth authorization token including one or more entries, each entry corresponding to a community of interest associated with the user of the first endpoint and including an encryption key and a validation key associated with the first endpoint and encrypted with the corresponding community of interest key; and
   entering an open final state;

wherein a community of interest includes a plurality of users having common user rights and segregating user groups by way of assignment, of different cryptographic keys used for each user group, and any message from by an unauthorized endpoint that is not a member of the community of interested are not responded to in any way.

8. The method of claim 1, wherein the first endpoint has a plurality modes including an on demand mode and an always on mode.

9. The method of claim 1, further comprising allowing a user to remotely access the first endpoint in each of the disconnected state, the pending state, the open state, and the closed state via an administrator-selected, predetermined IP-based protocol.

10. The method of claim 9, wherein the administrator-selected, predetermined IP-based protocol comprises Remote Desktop Protocol.

11. The method of claim 1, wherein the first message includes IPsec connectivity options supported by the endpoint.

12. The method of claim 1, further comprising, prior to transmitting the first message, establishing a licensing tunnel to a licensing server.

13. The method of claim 12, wherein the licensing tunnel is established using a second security protocol different from an IPsec security protocol that provides IPsec-secured communication between the first and second endpoints.

14. The method of claim 1, wherein the second endpoint is included in a filter, wherein the filter defines one or more endpoints with which the first endpoint is authorized to communicate.

15. An endpoint computing system comprising:
 a processor;
 a memory communicatively connected to the processor and storing secured communications software, the secured communications software, when executed by the processor, causing the endpoint computing system to perform a method of managing secure communications states within a secure network, the method comprising:
 in a disconnected state, transmitting from the endpoint computing system to a second endpoint a first message including an authorization token, the authorization token including one or more entries, each entry corresponding to a community of interest associated with a user of the endpoint computing system and including an encryption key and a validation key associated with the endpoint computing system and encrypted with a corresponding community of interest key and entering a pending state;
 in the pending state, receiving from the second endpoint a second message including a second authorization token at the endpoint computing system, the second authorization token including one or more entries, each entry corresponding to a community of interest associated with the second endpoint and including an encryption key and a validation key associated with the second endpoint and encrypted with the corresponding community of interest key;
 based on receipt of the second message, entering an open state and initializing a tunnel between the endpoint computing system and the second endpoint using an IPsec-based secured connection; and
 upon termination of the tunnel due to a termination or timeout message issued by at least one of the endpoint computing system and the second endpoint, entering a closed state;
 wherein a community of interest includes a plurality of users having common user rights and segregating user groups by way of assignment of different cryptographic keys used for each user group, and any message from by an unauthorized endpoint that is not a member of the community of interested are not responded to in any way.

16. The endpoint computing system of claim 15, wherein the secured communications software includes an applet presenting a user interface to a user allowing the user to provide user credentials to a logon service included in the secured communications software at the endpoint computing system.

17. The endpoint computing system of claim 15, Wherein the endpoint computing system has a plurality of modes including an on demand mode and an always on mode.

18. A system comprising:
 a first endpoint, the first endpoint including:
 a processor;
 a memory communicatively connected to the processor and storing secured communications software, the secured communications software, when executed by the processor, causing an endpoint computing system to perform a method of managing secure communications states within a secure network, the method comprising:
 in a disconnected state, transmitting from the first endpoint to a second endpoint a first message including an authorization token, the authorization token including one or more entries, each entry corresponding to a community of interest associated with a user of the first endpoint and including an encryption key and a validation key associated with the endpoint computing system and encrypted with a corresponding community of interest key and entering a pending state;
 in the pending state, receiving from the second endpoint a second message including a second authorization token at the first endpoint, the second authorization token including one or more entries, each entry corresponding to a community of interest associated with the second endpoint and including an encryption key and a validation key associated with the second endpoint and encrypted with the corresponding community of interest key, the second message further including a signature, an encryption value, and one or more response codes identifying a status of the second endpoint to the first endpoint;
 based on receipt of the second message, entering an open state and initializing a tunnel between the first endpoint and the second endpoint using an IPsec-based secured connection; and
 upon termination of the tunnel due to a termination or timeout message issued by at least one of the first endpoint and the second endpoint, entering a closed state;
 wherein the one or more response codes identify the second endpoint to the first endpoint as a proxy for a third endpoint;
 wherein a community of interest includes a plurality of users having common user rights and segregating user groups by way of assignment of different cryptographic keys used for each user group, and any message from by an unauthorized endpoint that is not a member of the community of interested are not responded to in any way.

19. The system of claim 18, further comprising the second endpoint, the third endpoint, and a fourth endpoint.

20. The system of claim 19, wherein communication between the first endpoint and the second endpoint are obscured to the fourth endpoint.

\* \* \* \* \*